US011273510B2

United States Patent
Teraoka et al.

(10) Patent No.: US 11,273,510 B2
(45) Date of Patent: Mar. 15, 2022

(54) SOLDERING APPARATUS AND METHOD FOR CREATING PROGRAM

(71) Applicant: Hakko Corporation, Osaka (JP)

(72) Inventors: Yoshitomo Teraoka, Osaka (JP); Tomoo Takahara, Osaka (JP)

(73) Assignee: HAKKO CORPORATION, Osaka (JP)

( * ) Notice: Subject to any disclaimer, the term of this patent is extended or adjusted under 35 U.S.C. 154(b) by 618 days.

(21) Appl. No.: 16/143,011

(22) Filed: Sep. 26, 2018

(65) Prior Publication Data

US 2019/0099819 A1    Apr. 4, 2019

Related U.S. Application Data

(60) Provisional application No. 62/566,653, filed on Oct. 2, 2017.

(30) Foreign Application Priority Data

Nov. 30, 2017  (JP) .............................. JP2017-230708

(51) Int. Cl.
    *B23K 3/00*    (2006.01)
    *B23K 3/08*    (2006.01)
    (Continued)

(52) U.S. Cl.
    CPC ................ *B23K 3/08* (2013.01); *B23K 3/025* (2013.01); *G05B 19/00* (2013.01)

(58) Field of Classification Search
    CPC .. B23K 1/0016; B23K 2101/40; B23K 3/033; B23K 1/018; B23K 2101/42; B23K 3/027; B23K 3/028; B23K 3/0607; B23K 3/063; B23K 3/08; B23K 1/012; B23K 20/123; B23K 20/124; B23K 20/1245; B23K 20/125; B23K 3/00; B23K 3/02; B23K 3/029; B23K 3/087; B23K 9/0209;
    (Continued)

(56) References Cited

U.S. PATENT DOCUMENTS 5,261,590 A * 11/1993  Tsai ..................... B23K 3/0615
                                                         228/41
5,542,600 A *  8/1996  Kobayashi ................ B25J 9/16
                                                         228/102

(Continued)

FOREIGN PATENT DOCUMENTS

| JP | 1993049997 | 3/1993 |
| JP | 2000-075912 A | 3/2000 |
| JP | 2002-271016 A | 9/2002 |

OTHER PUBLICATIONS

JP2002-271016A computer english translation (Year: 2002).*

*Primary Examiner* — Erin B Saad
(74) *Attorney, Agent, or Firm* — Squire Patton Boggs (US) LLP

(57) ABSTRACT

The present application discloses a soldering apparatus including a soldering iron having an iron tip that melts solder, a driving portion that moves the soldering iron, and an operation portion displaced to instruct the driving portion of a moving direction of the soldering iron. While an operation on the operation portion is performed by a user, the driving portion moves the soldering iron in a direction corresponding to a displacement direction of the operation portion.

11 Claims, 9 Drawing Sheets

(51) Int. Cl.
*B23K 3/02* (2006.01)
*G05B 19/00* (2006.01)

(58) Field of Classification Search
CPC ...... B23K 1/0018; B23K 1/0056; B23K 1/06; B23K 1/08; B23K 1/19; B23K 1/203; B23K 2101/001; B23K 2101/36; B23K 26/04; B23K 31/125; B23K 35/025; B23K 35/262; B23K 35/3013; B23K 35/304; B23K 37/00; B23K 37/0408; B23K 37/047; B23K 3/025; B23K 3/0323; B23K 3/0346; B23K 3/0369; B23K 3/047; B23K 3/0478; B23K 3/0615; B23K 3/0669; B23K 3/0676; B23K 3/082
See application file for complete search history.

(56) References Cited

U.S. PATENT DOCUMENTS

| | | | |
|---|---|---|---|
| 6,634,092 B1 * | 10/2003 | Iwasaki | B23K 1/012 29/740 |
| 2018/0200819 A1 * | 7/2018 | Teraoka | B23K 3/08 |
| 2018/0337735 A1 * | 11/2018 | Takahara | H04L 5/0053 |
| 2019/0099818 A1 * | 4/2019 | Teraoka | B23K 37/0205 |
| 2019/0099819 A1 * | 4/2019 | Teraoka | G05B 19/00 |

* cited by examiner

FIG.5
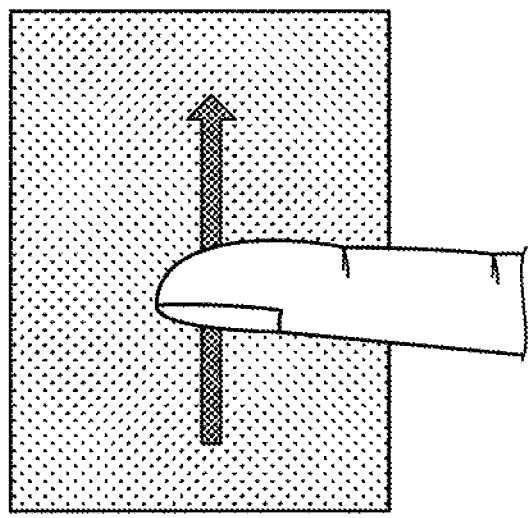
SECTION (c)
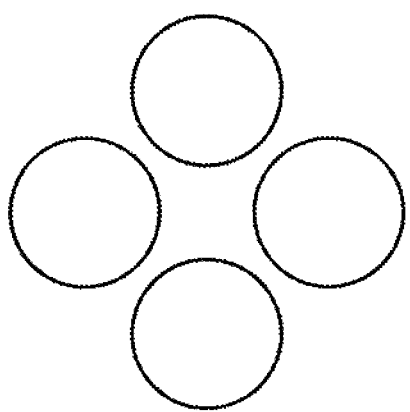
SECTION (b)
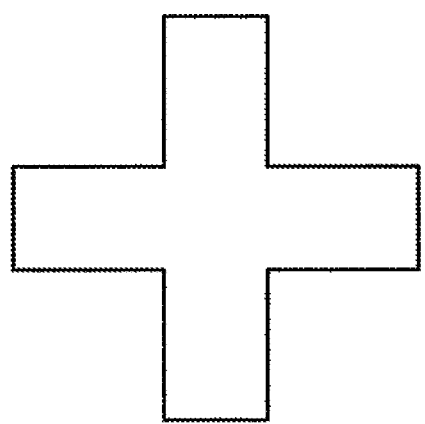
SECTION (a)

SOLDERING APPARATUS AND METHOD FOR CREATING PROGRAM

CROSS-REFERENCE TO RELATED APPLICATIONS

This application claims the benefit of Provisional Application No. 62/566,653, filed Oct. 2, 2017, which is hereby incorporated by reference. This application claims the benefit of Japanese Application No. 2017-230708, filed Nov. 30, 2017, which is hereby incorporated by reference.

TECHNICAL FIELD

The present invention relates to a soldering apparatus for automatically soldering at a predetermined soldering position and a method for creating a program for the soldering apparatus.

BACKGROUND ART

Various soldering apparatuses have been developed to automatically execute soldering at a predetermined soldering position (c.f. JP 2000-75912 A). According to JP 2000-75912 A, an operator inputs coordinate values of soldering positions to a personal computer. The soldering apparatus may then automatically perform soldering at the input soldering positions.

The operator inputting the coordinate values of the soldering positions to the personal computer has to watch a monitor of the personal computer. In order to confirm whether the input coordinate values of the soldering positions are correct or not, the operator has to visually confirm a positional relationship between an iron tip of a soldering iron moved to a soldering position in correspondence to an input coordinate value and a through-hole of an electronic board. If the soldering iron has reached an inappropriate position, the operator has to input a target coordinate value again. Therefore, the operator has to move a line of sight back and forth between the personal computer and the iron tip of the soldering iron during the setting work of the soldering positions. This makes the setting work of the soldering positions very troublesome. In addition to the setting work of the soldering positions, the operator may move the soldering iron to perform various operational cheeks. The aforementioned problem is also common to these operational checks.

SUMMARY OF INVENTION

It is an object of the present invention to provide a soldering apparatus and a method for creating a program for the soldering apparatus which allow an operator to move a soldering iron without the operator having to divert his/her line of sight from an iron tip of the soldering iron.

A soldering apparatus according to one aspect of the present invention includes: a soldering iron having an iron tip configured to melt solder; a driving portion configured to move the soldering iron; and an operation portion configured to be displaced for instructing the driving portion of a moving direction of the soldering iron. The driving portion moves the soldering iron in a direction in correspondence to a displacement direction of the operation portion during an operation on the operation portion.

A soldering apparatus according to another aspect of the present invention includes: a soldering iron having an iron tip configured to melt solder; a driving portion configured to move the soldering iron; and an operation portion to be operated for instructing the driving portion of a moving direction, of the soldering iron. The operation portion allows an operator operating the operation portion to perceive an operation direction of the operation portion through a tactile sense of the operator. The driving portion moves the soldering iron in a direction in correspondence to the operation direction of the operation portion during an operation on the operation portion.

A method for creating a program of a soldering operation according to another aspect of the present invention includes: repeating an input operation for determining the point soldering operation until the point soldering operation is set for all of soldering positions on the electronic board. The input operation includes (i) operating the lever portion to move the iron tip to a position in correspondence to one of the start and end points of one of the soldering positions, (ii) operating the storage request portion to store a coordinate value of the position in correspondence to the one of the start and end points in the storage, (iii) operating the lever portion to move the iron tip to a position in correspondence to another of the start and end points, and (iv) operating the storage request portion to store a coordinate value of the position in correspondence to the other of the start and end points in the storage.

The aforementioned techniques allow an operator to move a soldering iron without diverting a line of sight from an iron tip.

The objects, features, and advantages of the above-mentioned technique will become more apparent from the following detailed description and the accompanying drawings.

BRIEF DESCRIPTION OF DRAWINGS

FIG. 5 is a schematic view of various operation members usable as an operation portion of the soldering apparatus shown in FIG. 2;

DESCRIPTION OF EMBODIMENT

Figure 1:
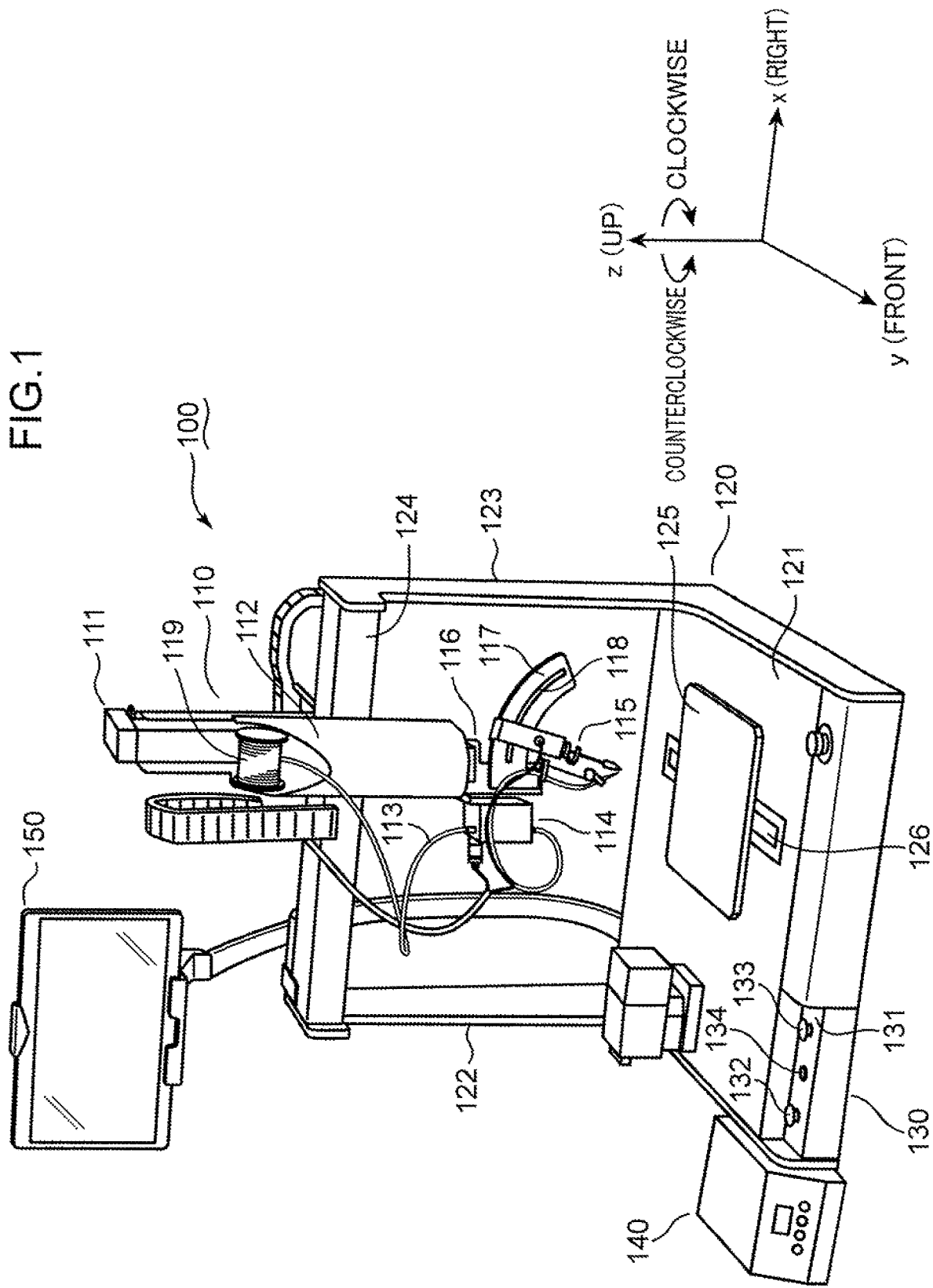
FIG. 1 is a schematic perspective view of an exemplary soldering apparatus.

FIG. 1 is a schematic perspective view of an exemplary soldering apparatus 100. The soldering apparatus 100 is described with reference to FIG. 1.

FIG. 1 shows orthogonal coordinates defined by x, y, z-axes. In the following description, a positive direction of the x-axis is defined as "right". A negative direction of the x-axis is defined as "left". A positive direction of the y-axis is defined as "front". A negative direction of the y-axis is defined as "rear". A positive direction of the z-axis is defined as "up". A negative direction of the z-axis is defined as "down". Terms "clockwise" and "counterclockwise" refer to rotation about a rotation axis parallel to the z-axis. These directional terms are used for clarity of explanation only. Therefore, a principle of the present embodiment is not limited by these directional terms.

The soldering apparatus 100 includes a soldering mechanism 110, a support 120, an operation unit 130, a heating controller 140, an input interlace 150 and a driving portion (not shown). The soldering mechanism 110 performs soldering to an electronic board (not shown). The support 120 supports the soldering mechanism 110, the operation unit 130 and the driving portion. Motors used as the driving portion are attached to the support 120 or the soldering mechanism 110. When an operator (a human user) operates the operation unit 130, the driving portion moves or rotates the soldering mechanism 110 in a direction determined by the operation on the operation unit 130. The heating controller 140 is used for temperature control of the soldering mechanism 110. The input interface 150 is used to input various operation parameters of the soldering apparatus 100.

The support 120 includes a base 121, two columns 122, 123, a support bridge 124 and an installation table 125. The base 121 is a portion formed like a substantially rectangular plate. The column 122 stands upward from a loft edge of the base 121. The column 123 stands upward from a right edge of the base 121. The columns 122, 123 are aligned in the x-axis direction. support bridge 124 is bridged from the left column 122 to the right column 123. Therefore, the support bridge 124 extends in the x-axis direction. The soldering mechanism 110 is attached to the support bridge 124. When the operator operates the operation unit 130, one of the motors used as the driving portion may move the soldering mechanism 110 along the support bridge 124.

The installation table 125 is a portion formed like a substantially rectangular plate, the installation table 125 being installed on an upper surface of the base 121. The operator may a the electronic board on the installation table 125. The operator may operate the operation unit 130 to move the soldering mechanism 110 on the installation table 125 in the x-axis direction and the z-axis direction, or to rotate the soldering mechanism 110 around a rotation axis in parallel to the z-axis. As shown in FIG. 1, a slot 126 extending in the y-axis direction is formed on the upper surface of the base 121. When the operator operates the operation unit 130, one of the motors used as the driving portion may move the installation table 125 along the slot 126. A relative positional relationship between the electronic board on the installation table 125 and the soldering mechanism 110 is adjusted by the movement of the soldering mechanism 110 in the x-axis direction and the z-axis direction. The relative positional relationship between the electronic board on the installation table 125 and the soldering mechanism 110 is adjusted by the movement of the installation table 125 in the y-axis direction.

The soldering mechanism 110 includes a horizontally movable column 111, a vertically movable column 112, a thread solder 113, a solder feeder 114, a soldering iron 115 and a holding portion 116. The horizontally movable column 111 holds the vertically movable column 112, the thread solder 113, the solder feeder 114, the soldering iron 115 and the holding portion 116, and moves in the x-axis direction under an operation of the driving portion. The operation is performed by a human user (an operator). The vertically movable column 112 holds the thread solder 113, the solder feeder 114, the soldering iron 115 and the holding portion 116, and moves in the z-axis direction under an operation of the driving portion. The holding portion 116 holds the solder feeder 114 and the soldering iron 115, and makes these go around a rotation axis substantially coincident with a vertical central axis of the vertically movable column 112. The solder feeder 114 feeds the thread solder 113 to an iron tip forming a distal end of the soldering iron 115. The iron tip may be made of any metal suitable for soldering. The soldering iron melts the thread solder 113 fed from the solder feeder 114. The aforementioned heating controller 140 is responsible for controlling a temperature of the iron tip of the soldering iron 115.

The horizontally movable column 111 is a columnar member elongated in the z-axis direction. The horizontally movable column 111, the support bridge 124 and the driving portion are designed so that the horizontally movable column 111 moves substantially horizontally along the support bridge 124 when one of the motors forming the driving portion is operated. A structure of a known soldering apparatus may be applied to a design of the horizontally movable column 111, the support bridge 134 and the driving portion. Therefore, the principle of the present embodiment is not limited to a specific coupling structure among the horizontally movable column 111, the support bridge 124 and the driving portion.

Like the horizontally movable column 111, the vertically movable column 112 is a columnar member elongated in the z-axis direction. The vertically movable column 112, the horizontally movable column 111 and the driving portion are designed so that the vertically movable column 112 moves substantially vertically along the horizontally movable column 111 when one of the motors forming the driving portion is operated. A structure of a known soldering apparatus may be applied to a design of the vertically movable column 112, the horizontally movable column 111 and the driving portion. Therefore, the principle of the present embodiment is not limited to a specific coupling structure among the vertically movable column 112, the horizontally movable column 111 and the driving portion.

The holding portion 116 is used for holding the solder feeder 114 and the soldering iron 115. The holding portion 116 is connected to a lower end of the vertically movable column 112. Therefore, the holding portion 116, the solder feeder 114 and the soldering iron 115 may move upward, downward, leftward and rightward together with the vertically movable column 112. The holding portion 116, the vertically movable column 112 and the driving portion are designed so that the holding portion 116 rotates around the rotation axis substantially coincident with the vertical central axis of the vertically movable column 112 when one of the motors forming the driving portion is operated. By operating the operation unit 130 to rotate the holding portion 116, the operator may prevent the soldering iron 115 from contacting an electronic component on the electronic board. Since both the solder feeder 114 and the soldering iron 115 are attached to the holding portion 116, a relative positional relationship of these does not change during the rotation of the holding portion 116. A structure of a known soldering apparatus may be applied to a design of the holding portion 116, the vertically movable column 112 and the driving portion. Therefore, the principle of the present embodiment is not limited to a specific coupling structure among the holding portion 116, the vertically movable column 112 and the driving portion.

The holding portion 116 includes an arcuate plate 117 to which the soldering iron 115 is attached. An arcuate slot 118 is formed in the arcuate plate 117. The operator may change an attachment position of the soldering iron 115 along the slot 118 to adjust a tilt angle of the soldering iron 115 with respect to an upper surface of the electronic board on the installation table 125. Scales (not shown) may be applied along the slot 118. In this case, the operator may grasp the tilt angle of the soldering iron 115 numerically.

The heating controller 140 is used to control a temperature of the iron tip of the soldering iron 115. Feedback control techniques used in a known soldering apparatus may be applied to the temperature control executed between the heating controller 140 and the soldering iron 115. Therefore, the principle of the present embodiment is not limited to a specific temperature control technique performed between the heating controller 140 and the soldering iron 115.

A solder bobbin 119 is attached to an upper end of the vertically movable column 112, the thread solder 113 being wound around the solder bobbin 119. The thread solder 113 extends from the solder bobbin 119 to the solder feeder 114. When soldering is performed, the solder feeder 114 feeds solder to the iron tip (or area near the iron tip) of the soldering iron 115 by an amount set by the operator. Accordingly, the solder is melted at the iron tip (or area near the iron tip) of the soldering iron 115. A structure of a solder feeding mechanism of a known soldering apparatus may be applied to the solder feeder 114. Therefore, the principle of the present embodiment is not limited to a specific structure of the solder feeder 114.

The operation unit 130 is mainly operated to instruct the aforementioned driving portion a direction of a relative movement of the soldering iron 115 with respect to the electronic board on the installation table 125. While the operator operates the operation unit 130, the aforementioned driving portion operates so that the soldering iron 115 may move in a direction indicated by the operation of the operation unit 130. With regard to the present embodiment, the operation unit 130 is formed as a lever unit attached to the base 121 in a recessed region which is recessed rearward from a front surface of the base 121 of the support 120. The operator may tilt levers of the lever unit to adjust a relative positional relationship between the electronic board on the installation table 125 and the soldering iron 115.

With regard to a conventional soldering apparatus, an operator operates dedicated software which is installed in a personal computer in order to make the soldering apparatus perform a desired operation. Therefore, the operator has to understand how to operate the software in order to operate the conventional soldering apparatus.

On the other hand, with regard to the soldering apparatus 100 of the present embodiment, an operator may determine moving directions and moving amounts of the soldering iron 115 and the installation table 125 on the basis of tilt directions of the levers. Therefore, the operator may operate the soldering apparatus 100 intuitively more than the conventional soldering apparatus.

With regard to a teaching operation of a soldering position using a conventional soldering apparatus robot, an operator has to confirm an operation for inputting a soldering position with the operator's line of sight directed to a monitor of the personal computer. In addition, the operator has to confirm whether or not an iron tip of a soldering iron actually reaches a soldering position set on an electronic board. Therefore, the operator performing the teaching operation of the soldering position has to move his/her line of sight back and forth between a monitor of the personal computer and the iron tip above the electronic board.

On the other hand, with regard to a teaching operation of a soldering position using the soldering apparatus 100 according to the present embodiment, an operator knows the tilt direction of the levers of the lever unit through a tactile sense of his/her fingertip (i.e. a direction of a reaction force received from the levers or a direction of a frictional force acting between the fingertip and the levers). Therefore, while visually confirming a position of the iron tip of the soldering iron 115, the operator may adjust a relative positional relationship between the iron tip of the soldering iron 115 and the soldering position set on the electronic board on the installation table 125 on the basis of the tactile sense of the fingertip. In other words, unlike the conventional teaching operation, the operator may focus on the iron tip without moving his/her line of sight back and forth between a monitor of a personal computer and the iron tip above the electronic board. This contributes to reducing effort of the teaching operation and results in making the teaching operation efficient.

The operation unit 130 includes a housing 131, a left lever 132, a right lever 133 and a storage request portion 134. The operator may tilt (i.e. angularly displace) the left and right levers 132, 133 projecting from an upper surface of the housing 131 to give an instruction to the soldering apparatus 100 so that the soldering apparatus 100 moves the soldering iron 115 and the installation table 125. The left and right levers 132, 133 protrude from the upper surface of the housing 131 but do not protrude above the base 121. The left and right levers 132, 133 do not disturb the operator working on the upper surface of the base 121. In addition, since the operator does not accidentally contact the left and right levers 132, 133, there is a low risk of an unintentional strong force applied to the operation unit 130. The storage request portion 134 is used to store in the soldering apparatus 100 coordinates off the iron tip of the soldering iron 115. When the iron tip of the soldering iron 115 reaches a predetermined soldering position set on the electronic board which is fixed on the installation table 125, the operator may operate the storage request portion 134, so that a position of the iron tip in a coordinate space set for arithmetic processes to be executed by the soldering apparatus 100 is stored in the soldering apparatus 100 as a coordinate value of the soldering position. Various electronic components are arranged in the housing 131, the various electronic components being configured to generate electric signals, which indicate tilt amounts of the left and right levers 132, 133, or which indicate that there is an operation on the storage request portion 134.

The operator may tilt the left and right levers 132, 133 to designate a change direction of relative positions between the electronic board on the installation table 125 and the iron tip of the soldering iron 115. With regard to the present embodiment, the left lever 132 is used to move the iron tip of the soldering iron 115 in an extending direction of the z-axis (i.e. upward and downward movement of the iron tip) and to rotate the holding portion 116 (i.e. circular movement of the iron tip of the soldering iron 115 around the rotation axis of the holding portion 116). The right lever 133 is used to move the iron tip of the soldering iron 115 in an extending direction of the x-axis (i.e. leftward and rightward movement of the iron tip) and to move the installation table 125 in an extending direction of the y-axis (i.e. relative forward and rearward movement of the iron tip with respect to the electronic board on the installation table 125). The following table shows a correspondence relationship of the operation of the soldering apparatus 100 with respect to the operation of the left and right levers 132, 133. The correspondence relationship in the following table is shown for clarity of explanation only. Therefore, the principle of the present embodiment is not limited to a specific correspondence relationship between an inclination of the left and right levers 132, 133 and an operation of the soldering apparatus 100.

TABLE 1

| Operation content | Left lever | Right lever |
| --- | --- | --- |
| Tilt forward | Move iron tip down | Move installation table forward |
| Tilt rearward | Move iron tip up | Move installation table rearward |
| Tilt rightward | Rotate iron tip clockwise | Move iron tip rightward |
| Tilt leftward | Rotate iron tip counterclockwise | Move iron tip leftward |

As shown in the above table, operation directions of the left and right levers 132, 133 are similar to the change direction of the relative positional relationship between the iron tip of the soldering iron 115 and the electronic board on the installation table 125. In other words, two sets of opposite operation directions of the left or right lever 132, 133 correspond to two sets of opposite operation directions of the soldering apparatus 100. Therefore, when the left or right lever 132, 133 is operated in an opposite direction, the operator may intuitively understand that the iron tip of the soldering iron 115 or the installation table 125 moves in a direction opposite to a moving direction under the previous operation. In particular, with regard to the right lever 133, since the tilt direction of the right lever 133 is coincident with a change direction of the relative positional relationship between the iron tip of the soldering iron 115 and the electronic board on the installation table 125, the operator may intuitively move the iron tip of the soldering iron 115 on a predetermined horizontal plane. Unlike an operation on a conventional soldering apparatus which requires understanding complicated operational contents about how to operate software for moving the iron tip, the operator may intuitively operate the soldering apparatus 100 to move the iron tip of the soldering iron 115 to a desired position on the electronic board fixed on the installation table 125. This is very useful for improving efficiency of the teaching operation in which the operator moves the iron tip of the soldering iron 115 to soldering positions set on the electronic board under the operation of the operator himself/herself. With regard to the present embodiment, the left lever 132 is used as the first lever. The right lever 133 is used as the second lever.

When the iron tip reaches a soldering position defined on the electronic board on the installation table 125 during the teaching operation, the operator may operate the storage request portion 134 situated between the left and right levers 132, 133 to input the coordinate position of the iron tip in the coordinate space set for arithmetic processes to be executed by the soldering apparatus 100. Accordingly, the soldering apparatus 100 may store an input coordinate position as the soldering position. If several soldering positions are set on the electronic board, an input operation is repeated under the operation of the operation unit 130. During the subsequent soldering operation, the soldering apparatus 100 may automatically perform soldering with reference to stored coordinate values of the soldering position. With regard to the present embodiment, the storage request portion 134 is designed as a general pressing button. Therefore, the operator may perceive a reaction force received from the pressing button with his/her fingertip to judge whether or not the pressing button has been operated. However, the storage request portion 134 may have another shape or structure which allows the operator to perceive that the operation has been performed through a tactile sense.

The pressing button used as the storage request portion 134 may slightly protrude from the upper surface of the housing 131. In this case, the operator may perceive the protrusion of the pressing button with his/her fingertip and confirm that the pressing button is pressed. Since the pressing button is much less protrusive than the left and right levers 132, 133, the operator does not confuse the pressing button with the left and right levers 132, 133. Alternatively, the pressing button may be different in surface from the upper surface of the housing 131. If a surface of the pressing button is curved convexly or concavely whereas the upper surface of the housing 131 is flat, the operator may perceive that the pressing button is operated with the fingertip. Alternatively, if the surface of the pressing button is made of rubber whereas the upper surface of the housing 131 is made of resin or metal, the operator may perceive a difference in texture of the surface with the fingertip and confirm that the pressing button has been operated. Therefore, the principle of the present embodiment is not limited to a specific structure of the storage request portion 134.

The input interface 150 is attached to a distal end of an arm extending upward from a rear surface of the base 121. The input interface 150 is used to input other operation parameters for operation of the soldering apparatus 100 (e.g. a feeding amount of the aforementioned thread solder 113). With regard to the present embodiment, a touch panel is used as the input interface 150. Unlike the operation on the operation unit 130 which largely depends on the tactile sense of the operator, the input operation to the input interface 150 largely depends on vision of the operator. Therefore, it is preferable that operation parameters to be input to the input interface 150 are information which does not require confirmation of movement of the soldering iron 115 or position of the iron tip. However, software may be designed to be executed by the input interface 150 so that the iron tip of the soldering iron 115 and the installation table 125 move under operation on the input interface 150 by the operator. The principle of the present embodiment is not limited to a specific function resulting from the software to be executed by the input interface 150.

The input interface 150 may display coordinate values (i.e. soldering positions) input during the aforementioned teaching operation. Therefore, the operator may grasp a result of the teaching operation numerically.

Figure 2:
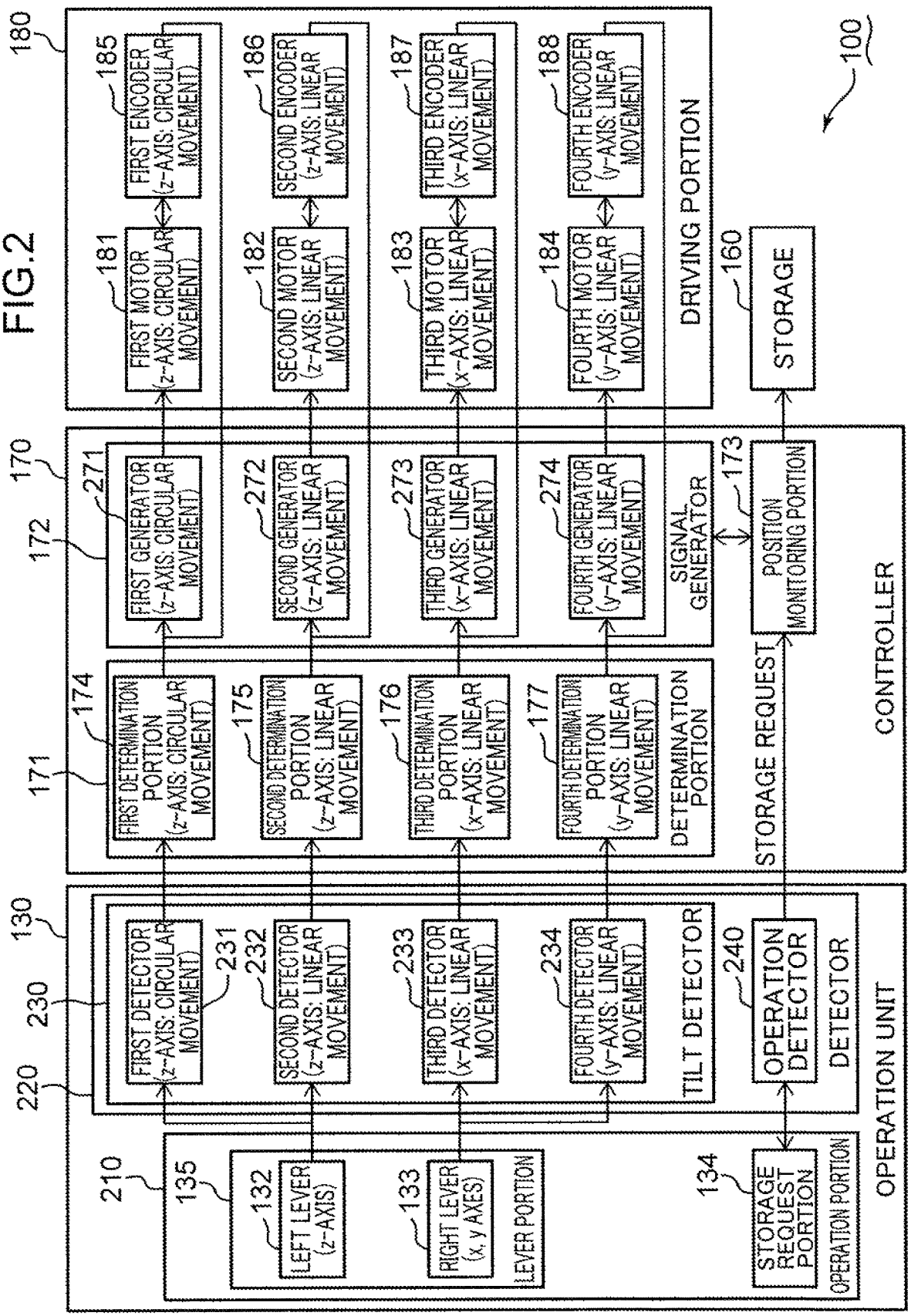
FIG. 2 is a block diagram showing an exemplary functional configuration of the soldering apparatus shown in FIG. 1.

FIG. 2 is a block diagram showing an exemplary functional configuration of the soldering apparatus 100. The soldering apparatus 100 is further described with reference to FIGS. 1 and 2.

The soldering apparatus 100 further includes storage 160 (memory from which data may be stored and read) and a controller 170. The controller 170 controls the aforementioned driving portion 180 under the operation of the operation unit 130. The storage 160 stores coordinate data of the iron tip of the soldering iron 115 determined by an operation on the storage request portion 134 of the operation unit 130.

FIG. 2 shows the left and right levers 132, 133 and the storage request portion 134 as an operation portion 210. In addition, FIG. 2 shows the left and right levers 132, 133 as a lever portion 135. The operation unit 130 further includes a detector 220 configured to detect an operation on the operation portion 210. The detector 220 is situated in the housing 131. The detector 220 includes a tilt detector 230 and an operation detector 240. The tilt detector 230 detects inclinations of the left and right levers 132, 133. The operation detector 240 detects an operation to the storage request portion 134.

The tilt detector 230 includes a first detector 231, a second detector 232, a third detector 233 and a fourth detector 234. A pair of the first and second detectors 231, 232 corresponds to the left lever 132. A pair of the third and fourth detectors 233, 234 corresponds to the right lever 133. The first detector 231 may be a rotary encoder configured to detect leftward and rightward tilt angles of the left lever 132 or may be another angle detection element. The second detector 232 may be a rotary encoder configured to detect forward and rearward tilt angles of the left lever 132 or may be another angle detection element. The third detector 233 may be a rotary encoder configured to detect leftward and rightward. tilt angles of the right lever 133 or may be another angle detection element. The fourth detector 234 may be a rotary encoder configured to detect forward and rearward tilt angles of the right lever 133 or may be another angle detection element.

The first to fourth detectors 231-234 generate electric signals different in waveform in response to a tilt direction of the lever portion 135. In other words, an electric signal output from the first detector 231 when the operator tilts the left lever 132 forward is different in waveform from an electric signal output from the first detector 231 when the operator tilts the left lever 132 rearward. An electric signal output from the second detector 232 when the operator tilts the left lever 132 leftward is different in waveform from an electric signal output from the second detector 232 when the operator tilts the left lever 132 rightward. Likewise, the third and fourth detectors 233, 234 output electric signals different in waveform in accordance with a tilt direction of the right lever 133.

The controller 170 includes a determination portion 171, a signal generator 172 and a position monitoring portion 173. The determination portion 171 determines how the user is operating the driving portion 180, the determination being made on the basis of the electric signal from the tilt detector 230. The signal generator 172 generates a driving signal so that the driving portion 180 executes an operation determined by the determination portion 171. The driving portion 180 operates in response to the driving signal. The position monitoring portion 173 refers to signal generation processes of the signal generator 172 to obtain positional information indicating a current position of the iron tip of the soldering iron 115. The positional information is output to the storage 160 in response to a storage request output from the operation detector 240 when the storage request portion 134 is operated. The storage 160 stores the positional information as a soldering position obtained as a result of the teaching operation (i.e. teaching data).

The determination portion 171 includes a first determination portion 174, a second determination portion 175, a third determination portion 176 and a fourth determination portion 177. The first to fourth determination portions 174-177 receive electric signals from the first to fourth detectors 231-234, respectively. As described above, the electric signals from the first to fourth detectors 231-234 are different in waveform in accordance with the tilt direction of the lever portion 135. Accordingly, the first to fourth determination portions 174-177 may determine the tilt direction of the lever portion 135 with reference to the waveforms of the electric signals from the first to fourth detectors 231-234. In other words, the first determination portion 174 may determine whether the left lever 132 is tilted leftward or rightward. The second determination portion 175 may determine whether the left lever 132 is tilted forward or rearward. The third determination portion 176 may determine whether the right lever 133 is inclined leftward or rightward. The fourth determination portion 177 may determine whether the right lever 133 is tilted forward or rearward.

The first to fourth determination portions 174-177 may determine what kind of operation the operator requests the soldering apparatus 100 on the basis of the correspondence relationship shown in "Table 1". The first determination portion 174 determining that the left lever 132 is inclined leftward determines that the operator has requested to rotate the iron tip of the soldering iron 115 counterclockwise, and generates an operational instruction to instruct counterclockwise circular movement of the iron tip. The first determination portion 174 determining that the left lever 132 is inclined rightward determines that the operator has requested to rotate the iron tip of the soldering iron 115 clockwise, and generates an operational instruction to instruct clockwise circular movement of the iron tip. The second determination portion 175 determining that the left lever 132 is inclined forward determines that the operator has requested to move the iron tip of the soldering iron 115 down, and generates an operational instruction to instruct downward movement of the iron tip. The second determination portion 175 determining that the left lever 132 is inclined rearward determines that the operator has requested to move the iron tip of the soldering iron 115 up, and generates an operational instruction to instruct upward movement of the iron tip. The third determination portion 176 determining that the right lever 133 is inclined leftward determines that the operator has requested to move the iron tip of the soldering iron 115 leftward, and generates an operational instruction to instruct leftward movement of the iron tip. The third determination portion 176 determining that the right lever 133 is inclined rightward determines that the operator has requested to move the iron tip of the soldering iron 115 rightward, and generates an operational instruction to instruct rightward movement of the iron tip. The fourth determination portion 177 determining that the right lever 133 is inclined forward determines that the operator has requested to move the installation table 125 forward, and generates an operational instruction to instruct forward movement of the installation table 125. The fourth determination portion 177 determining that the right lever 133 is inclined rearward determines that the operator has requested to move the installation table 125 rearward, and generates an operational instruction to instruct rearward movement of the installation table 125. These operational instructions are output from the determination portion 171 to the signal generator 172.

The signal generator 172 includes a first generator 271, a second generator 272, a third generator 273 and a fourth generator 274. The first to fourth generators 271-274 receive driving instructions from the first to fourth determination portions 174-177, respectively. In response to the driving instruction from the first determination portion 174, the first generator 271 generates a driving signal for rotating the iron tip of the soldering iron 115 in a counterclockwise or clockwise direction. In response to the driving instruction from the second determination portion 175, the second generator 272 generates a driving signal for moving down or up the iron tip of the soldering iron 115. In response to the driving instruction from the third determination portion 176, the third generator 273 generates a driving signal for moving the iron tip of the soldering iron 115 leftward or rightward. In response to the driving instruction from the fourth determination portion 177, the fourth generator 274 generates a driving signal for moving the installation table 125 forward or rearward. These driving signals are output from the signal generator 172 to the driving portion 180.

The driving portion 180 includes a first motor 181, a second motor 182, a third motor 183, a fourth motor 184, a first encoder 185, a second encoder 186 a third encoder 187 and a fourth encoder 188. The first to fourth motors 181-184 receive driving signals from the first to fourth generators 271-274, respectively. The first motor 181 rotates the holding portion 116 so that the iron tip of the soldering iron 115 rotates counterclockwise or clockwise in response to the driving signal from the first generator 271. The second motor 182 moves down or up the vertically movable column 112 in response to the driving signal from the second generator 272. Accordingly, the iron tip of the soldering iron 115 attached to the vertically movable column 112 via the holding portion 116 also moves down or up. The third motor 183 moves the horizontally movable column 111 leftward or rightward in response to the driving signal from the third generator 273. Since the soldering iron 115 is attached to the horizontally movable column 111 via the holding portion 116 and the vertically movable column 112, the iron tip of the soldering iron 115 may also move leftward or rightward together with the horizontally movable column 111. The fourth motor 184 moves the installation table 125 forward or rearward in response to the driving signal from the fourth generator 274. Accordingly, a relative position of the iron tip of the soldering iron 115 with respect to the electronic board (not shown) on the installation table 125 changes forward or rearward.

The first to fourth encoders 185-188 are respectively attached to the first to fourth motors 181-184 to detect their rotation amounts. Electric signals representing the detected rotation amounts are output from the first to fourth encoders 185-188 to the first to fourth generators 271-274. The first to fourth generators 271-274 refer to the electric signals from the first to fourth encoders 185-188 and perform feedback control on the first to fourth motors 181-184.

The position monitoring portion 173 of the controller 170 may monitor the signal generation processes of the signal generator 172 to obtain a relative position of the iron tip of the soldering iron 115 with respect to the electronic board mounted on the installation table 125 in real time. In other words, the position monitoring portion 173 may hold positional information indicating a current position of the iron tip in real time.

The operator may grasp how the operator himself operates the lever portion 135 through a tactile sense of the fingertip. Therefore, the operator may visually grasp a relative positional relationship between the electronic board on the installation table 125 and the iron tip of the soldering iron 115 during movement of the iron tip of the soldering iron 115 or the installation table 125. The operator confirming that the iron tip of the soldering iron 115 has reached the soldering position set on the electronic board may press the pressing button designed as the storage request portion 134. The operation detector 240 may be a switching element configured to form a transmission path for transmitting an electric signal to the position monitoring portion 173 when the pressing button is pressed. When the storage request portion 134 is operated by the operator, the operation detector 240 generates a storage request for requesting storage of the coordinate value of the soldering position. An electric signal generated as the storage request is output from the storage request portion 134 to the position monitoring portion 173. Upon receiving the storage request, the position monitoring portion 173 outputs to the storage 160 positional information at reception time of the storage request. The storage 160 stores the positional information from the position monitoring portion 173 as the coordinate value of the soldering position.

As described above, the position monitoring portion 173 grasps a relative position of the iron tip of the soldering iron 115 in real time. The iron tip itself moves when there is an instruction for movement of the iron tip of the soldering iron 115 in the x-axis direction and the z-axis direction and circular movement of the iron tip around the z-axis whereas the installation table 125 moves when there is instruction for movement of the iron tip in the y-axis direction. Therefore, the position monitoring portion 173 performs predetermined coordinate processes to find a current position of the iron tip.

Figure 3:
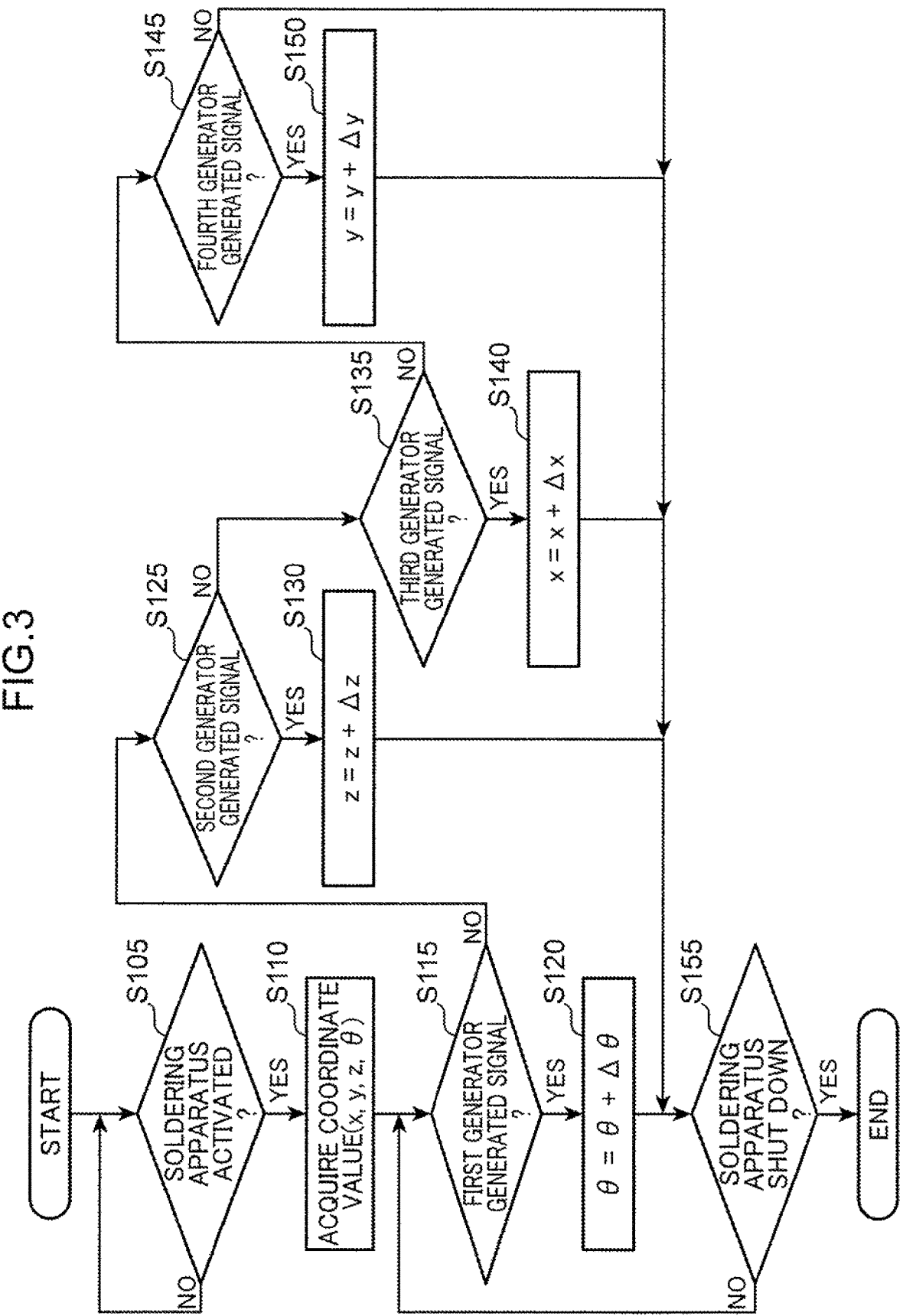
FIG. 3 is a schematic flowchart showing, exemplary coordinate processes of a position monitoring portion of the soldering apparatus shown in FIG. 2.

FIG. 3 is a schematic flowchart showing exemplary coordinate processes of the position monitoring portion 173. The coordinate processes of the position monitoring portion 173 is described with reference to FIGS. 1 to 3.

(Step S105)

The position monitoring portion 173 waits for activation of the soldering apparatus 100. When the soldering apparatus 100 is activated, step S110 is executed.

(Step S110)

The position monitoring portion 173 acquires a coordinate value before the soldering apparatus 100 is activated (i.e. acquires a coordinate value of the iron tip when the soldering apparatus 100 was last shut down). A symbol "x" shown in FIG. 3 represents a position of the iron tip of the soldering iron 115 on the x-axis. A symbol "y" shown in FIG. 3 represents a position of file installation table 125 on the y-axis. A symbol "z" shown in FIG. 3 represents a position of the iron tip on the z-axis. A symbol "θ" shown in FIG. 3 represents a rotational position of the iron tip around a rotation axis that is parallel to the z-axis. After the coordinate value is acquired, step S115 is executed.

(Step S115)

The position monitoring portion 173 confirms whether or not the first generator 271 generates a driving signal. If the first generator 271 generates the driving signal, step S120 is executed. Otherwise, step S125 is executed.

(Step S120)

The position monitoring portion 173 refers to the driving signal generated by the first generator 271 to determine a change value "Δθ" in correspondence to the driving signal and a sign (i.e. plus or minus) of the Change value "Δθ". The sign of the change value "Δθ" represents a rotating direction (clockwise or counterclockwise) of the iron tip. The position monitoring portion 173 changes a value of a variable "θ" representing a rotational position of the iron tip by the change value "Δθ". If the change value "Δθ" is a positive value, the position monitoring portion 173 adds the change value "Δθ" to the value of the variable "θ". If the change value "Δθ" is a negative value, the position monitoring portion 173 subtracts the change value "Δθ" from the value of the variable "θ".

(Step S125)

The position monitoring portion 173 confirms whether or not the second generator 272 generates a driving signal. If the second generator 272 generates the driving signal, step S130 is executed. Otherwise, step S135 is executed.

(Step S130)

The position monitoring portion 173 refers to the driving signal generated by the second generator 272 to determine a change value "Δz" in correspondence to the driving signal and a sign (i.e. plus or minus) of the change value "Δz". The sign of the change value "Δz" represents a moving direction (i.e. upward or downward movement) of the iron tip. The position monitoring portion 173 changes a value of a variable "z" representing a position of the iron tip on the z-axis by the change value "Δz". If the change value "Δz" is a positive value, the position monitoring portion 173 adds the change value "Δz" to the value of the variable "z". If the change value "Δz" is a negative value, the position monitoring portion 173 subtracts the change value "Δz" from the value of the variable "z".
(Step S135)

The position monitoring portion 173 confirms whether or not the third generator 273 generates a driving signal. If the third generator 273 generates the driving signal, step S140 is executed. Otherwise, step S145 is executed.
(Step S140)

The position monitoring portion 173 refers to the driving signal generated by the third generator 273 to determine a change value "Δx" in correspondence to the driving signal and a sign (i.e. plus or minus) of the change value "Δx". The sign of the change value "Δx" represents a moving direction (i.e. leftward or rightward) of the iron tip. The position monitoring portion 173 changes a value of a variable "x" representing a position of the iron tip on the x-axis by the change value "Δx". If the change value "Δx" is a positive value, the position monitoring portion 173 adds the change value "Δx" to the value of the variable "x". If the change value "Δx" is a negative value, the position monitoring portion 173 subtracts the change value "Δx" from the value of the variable "x".
(Step S145)

The position monitoring portion 173 confirms whether or not the fourth generator 274 generates a driving signal. If the fourth generator 274 generates the driving signal, step S150 is executed. Otherwise, step S155 is executed.
(Step S150)

The position monitoring portion 173 refers to the driving signal generated by the fourth generator 274 to determine a change value "Δy" in correspondence to the driving signal and a sign (i.e. plus or minus) of the change value "Δy". The sign of the change value "Δy" represents a moving direction (i.e. forward or rearward) of the installation table 125. The position monitoring portion 173 changes a value of a variable "y" representing a position of the installation table 125 on the y-axis by the change value "Δy". If the change value "Δy" is a positive value, the position monitoring portion 173 adds the change value "Δy" to the value of the variable "y". If the change value "Δy" is a negative value, the position monitoring portion 173 subtracts the change value "Δy" from the value of the variable "y".
(Step S155)

If the operator has not performed an operation of shutting down the soldering apparatus 100, step S115 is executed. If the operator shuts down the soldering apparatus 100, a current coordinate value (x, y, z, θ) is stored. Thereafter, when the soldering apparatus 100 is activated again, the stored coordinate value (x, y, z, θ) is acquired in step S110.

Figure 4:
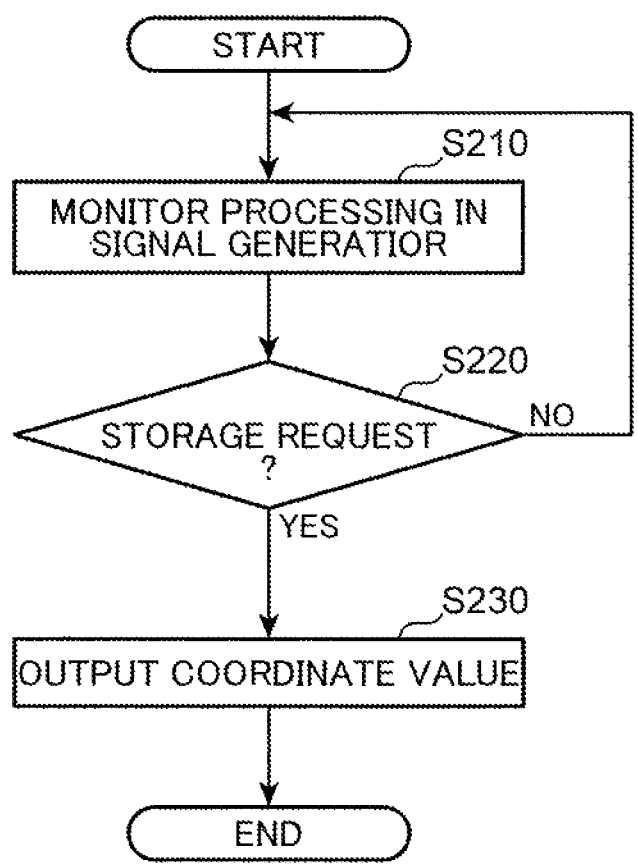
FIG. 4 is a schematic flowchart showing exemplary processes of the position monitoring portion.

FIG. 4 is a schematic flowchart showing output processes of a coordinate value from the position monitoring portion 173 to the storage 160. The output processes of the coordinate value performed at the time of teaching the soldering position are described with reference to FIGS. 1 to 4.
(Step S210)

The position monitoring portion 173 executes the processes shown in FIG. 3 to monitor the signal generation processes of the signal generator 172. Accordingly, the position monitoring portion 173 may acquire information about a current position of the iron tip of the soldering iron 115 in real time. After acquiring the information about the current position of the iron tip, step S220 is executed.
(Step S220)

The position monitoring portion 173 determines whether or not a storage request has been received from the operation detector 240. If the storage request is output from the operation detector 240 to the position monitoring portion 173, step S230 is executed. Otherwise, step S210 is executed.
(Step S230)

The coordinate value (x, y, z, θ) described with reference to FIG. 3 is output from the position monitoring portion 173 to the storage 160.

Other Features

A designer may give various features to the aforementioned soldering apparatus 100. The following features do not limit a design principle of the soldering apparatus 100 at all.
(Change in Moving Speed in Accordance with Tilt Amount)

The tilt detector 230 described with reference to FIG. 2 may detect not only the tilt direction of the lever portion 135 but also a tilt amount of the lever portion 135. In this case, the electric signal output from the tilt detector 230 may include not only the tilt direction of the lever portion 135 but also information indicating the tilt amount of the lever portion 135.

The determination portion 171 described with reference to FIG. 2 may determine a moving speed of the iron tip of the soldering iron 115 (and the installation table 125) on the basis of the tilt amount of the lever portion 135. The following mathematical expression expresses a relationship between the tilt amount of the lever portion 135 and the moving speed of the iron tip (and the installation table 125). The determination portion 171 may determine the moving speed of the iron tip (and the installation table 125) using the following mathematical expression. However, the determination portion 171 may refer to a look-up table showing a relationship between the tilt amount of the lever portion 135 and the moving speed of the iron tip (and the installation table 125) to determine the moving speed of the iron tip (and the installation table 125). The principle of the present embodiment is not limited to specific processes for determining the moving speed of the iron tip (and the installation table 125).

$$V = F(\text{Tilt amount}) \qquad \text{[Mathematical Expression 1]}$$

F( ): Increasing function of tilt amount
V: Moving speed

Since a relational expression "F( )" shown in "Mathematical Expression 1" is an increasing function, the iron tip of the soldering iron 115 (and the installation table 125) may move at a high speed when the tilt amount is a large value. On the other hand, the iron tip (and the installation table 125) may move at a low speed when the tilt amount is a small value. Therefore, the operator may change a tilt angle of the lever portion 135 to adjust the moving speed of the iron tip (and the installation table 125).

The lever portion 135 may be biased toward a predetermined neutral position by a spring or another resilient component. If the tilt amount of the lever portion 135 is large, the operator's fingertip may receive a large reaction force from the lever portion 135. On the other hand, if the tilt amount of the lever portion 135 is small, the operator's fingertip may receive a small reaction force from the lever portion 135. Based on the reaction force from the lever portion 135 sensed by the fingertip, the operator may perceive how large the tilt amount of the lever portion 135 is. Therefore, the operator may adjust the moving speed of the iron tip of the soldering iron 115 (and the installation table 125) while keeping his/her line of sight at the iron tip of the soldering iron 115.

The determination portion 171 generates driving instructions to instruct moving directions and moving speeds of the iron tip of the soldering iron 115 and the installation table 125. The signal generator 172 generates a driving signal in response to the driving instruction. Upon receiving the driving signal, the driving portion 180 moves the iron tip of the soldering iron 115 and the installation table 125 at specified speeds in the designated directions.

(Alternative Operation Portion)

With regard to the aforementioned embodiment, the operation portion 210 includes the lever portion 135. However, instead of the lever portion 135, an operation member having another structure may be used. The various types of the operation portion 210 are described below.

FIG. 5 is a schematic view of various operation members usable as the operation portion 210. Various operation members are described with reference to FIGS. 1, 2 and 5.

Section (a) of FIG. 5 is a schematic plan view of a cross key. Two cross keys may be used instead of the left and right levers 132, 133. The operator may place the fingertip on the cross key to perceive a shape of the cross key with a tactile sense. The operator may then select a pressing portion on the cross key to move the iron tip of the soldering iron 115 in a desired direction.

Section (b) of FIG. 5 is a schematic plan view of a set of four pressing buttons. Two sets of four pressing buttons may be used instead of the left and right levers 132, 133. The operator may place the fingertip at a center of an arrangement area of the four pressing buttons to grasp arrangement of the four pressing buttons. The operator may then select one of the four pressing buttons to move the iron tip of the soldering iron 115 in a desired direction.

The lever portion 135, the cross key and the pressing button are displaced in accordance with an operation of the operator. As described above, the lever portion 135 is inclined in accordance with the operation of the operator. The cross key and the pressing button sink in accordance with the operation of the operator. On the other hand, an operation member without displacement even under an operation of the operator may be used as the operation portion 210.

Section (c) of FIG. 5 is a schematic plan view of a slide pad like one which is mounted on a typical laptop computer. The slide pad may be different in surface texture from the upper surface of the housing 131 (e.g. a surface texture generating a high frictional force). The operator may detect a difference in texture with the fingertip to perceive a presence of the fingertip on the slide pad. The operator may move the fingertip in a desired direction to move the iron tip of the soldering iron 115 in a desired direction. The operator may judge a moving direction of the fingertip from a direction of the frictional force received from the slide pad.

(Setting of Point Soldering Operation)

Figure 6:
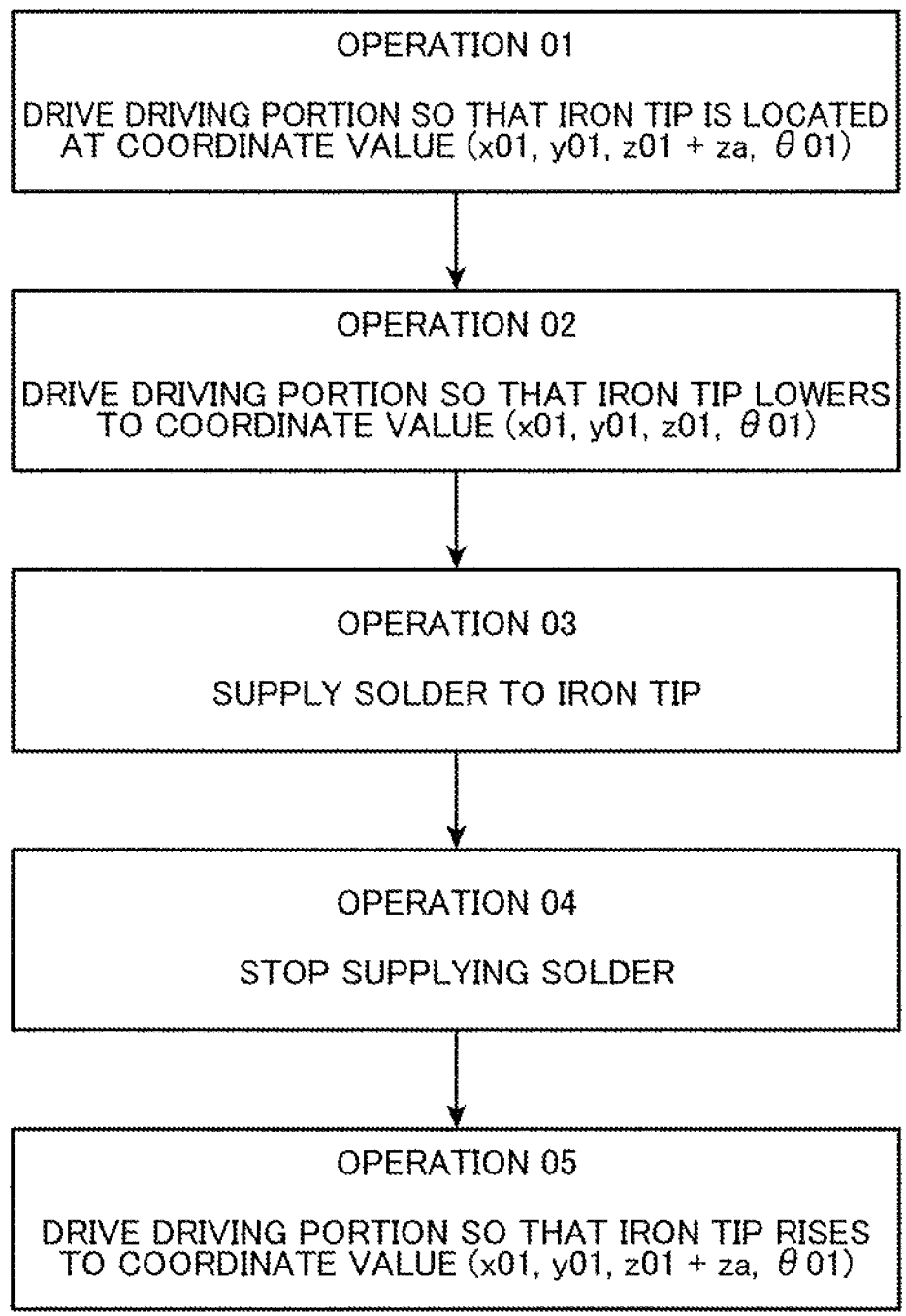
FIG. 6 is a flowchart schematically showing a point soldering operation at one soldering position on an electronic board.

FIG. 6 is a flowchart schematically showing a point soldering operation at one soldering position on the electronic board. The point soldering operation at one soldering position on the electronic board is described with reference to FIGS. 1 and 6.

A coordinate value shown in FIG. 6 corresponds to a position in the x-axis direction of the iron tip of the soldering iron 115, a position in the y-axis direction of the iron tip, a position in the z-axis direction of the iron tip, and an angular position of the iron tip around the rotation axis of the holding portion 116. A coordinate value "z01" of the position in the z-axis direction represents a position substantially coincident with the surface of the electronic board. A symbol "za" in a z coordinate value in FIG. 6 represents an amount of retreat from the electronic board, and a z coordinate value "z01+za" in FIG. 6 indicates that the iron tip of the soldering iron 115 is situated above the surface of the electronic board by the retreat amount "za".

When the point soldering operation shown in FIG. 6 is started, the driving portion 180 moves the soldering iron 115 so that the iron tip of the soldering iron 115 is situated above a soldering position represented by a coordinate value (x01, y01, z01, θ01) by the retreat amount "za" (operation 01). The driving portion 180 then moves down the soldering iron 115 by the retreat amount "za" (operation 02). Accordingly, the iron tip of the soldering iron 115 reaches the soldering position represented by the coordinate value (x01, y01, z01, θ01). The solder feeder 114 then feeds the thread solder 113 to the iron tip of the soldering iron 115 (operation 03). A tip of the thread solder 113 is melted by the heated iron tip under the control of the heating controller 140, and dot-shaped solder adheres to the surface of the electronic board at the soldering position represented by the coordinate value (x01, y01 z01, θ01). When a predetermined amount of thread solder 113 is supplied to the iron tip, the solder feeder 114 stops feeding the thread solder 113 (operation 04). The driving portion 180 then moves the soldering iron 115 so that the iron tip of the soldering iron 115 moves up by the retreat amount "za" (operation 05).

FIG. 6 shots that the point soldering operation may be set by the two coordinate values (x01, y01, z01, θ01), (x01, y01, z01+za, θ01), in other words, the operator may input the two coordinate values (x01, y01, z01, θ01), (x01, y01, z01+za, θ01) for one soldering position. The soldering apparatus 100 enables the operator to operate the operation unit 130 to set the point soldering operation with respect to the soldering position on the electronic board. Unlike the background art, it is not necessary for the operator to operate a personal computer for setting the point soldering operation.

Figure 7:
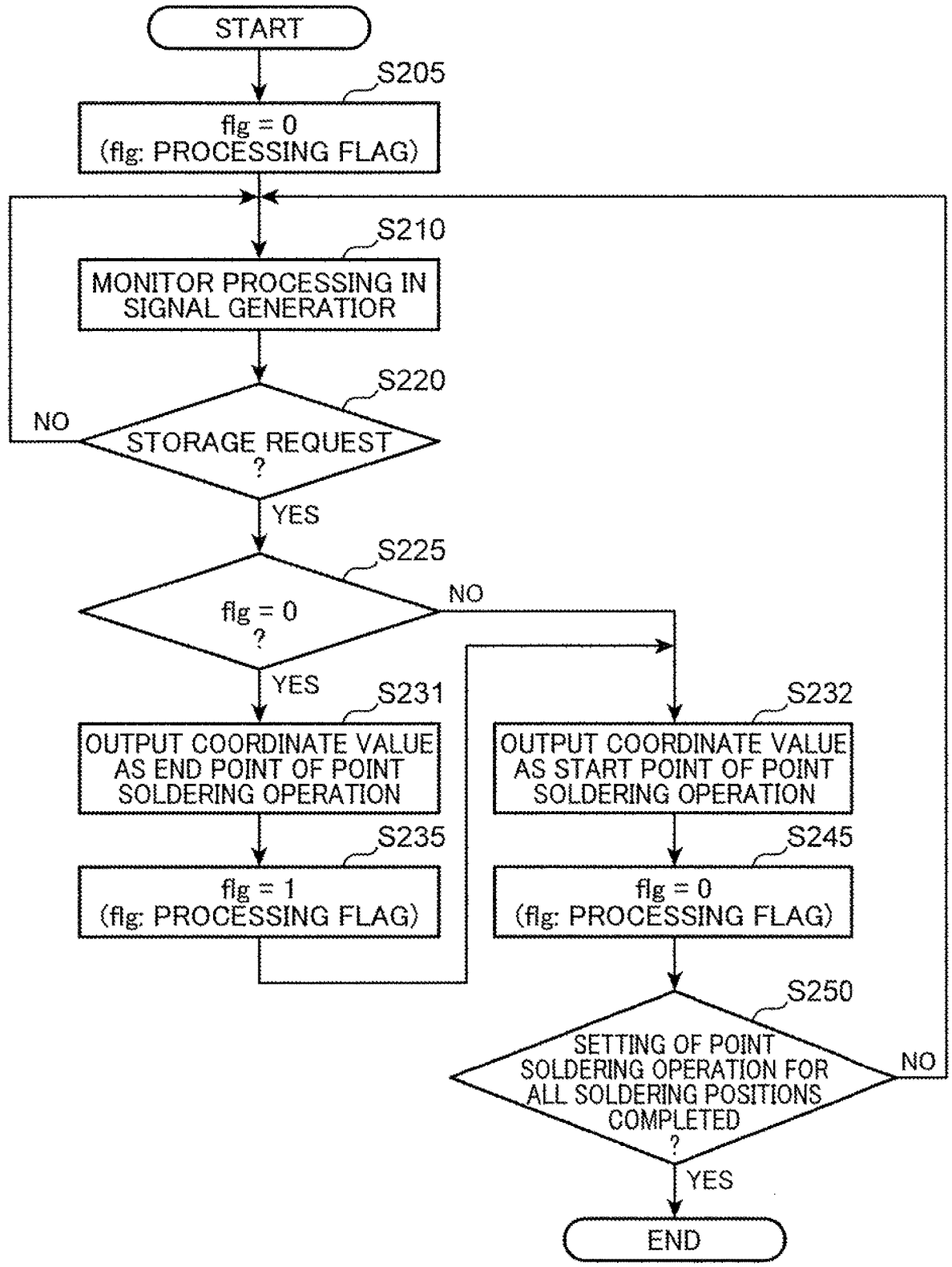
FIG. 7 is a schematic flowchart showing output processes of coordinate values in the position monitoring portion.

FIG. 7 is a schematic flowchart showing output processes of coordinate values in the position monitoring portion 173. According to the flowchart shown in FIG. 7, the position monitoring portion 173 may output coordinate values to the storage 160 by dividing the coordinate values into a start point of the point soldering operation (a position in correspondence to the coordinate value (x01, y01, z01+za, θ01)) and an end point thereof (a position in correspondence to the coordinate value (x01, y01, z01 θ01)). The output processes of the coordinate values of the position monitoring portion 173 are described with reference to FIGS. 1, 2 and 7.

(Step S205)

When the operator executes a predetermined operation for starting the teaching operation on the input interface 150, step S205 is executed. The position monitoring portion 173 sets a value of a processing flag "flg" to "0" for identifying whether it is the start or endpoint of the point soldering operation. When the value of the processing flag "flg" is "0", the position monitoring portion 173 determines that the operator has manipulated the storage request portion 134 to input the end point. When the value of the processing flag "flg" is "1", the position monitoring portion 173 determines that the operator has manipulated the storage request portion 134 to input the start point. With regard to the present embodiment, it is defined in an operation procedure manual of the soldering apparatus 100 that an operator inputs the start point next to the end point. However, it may be defined in an operation procedure manual that an operator inputs the end point next to the start point. The principle of the present embodiment is not limited to a specific input order of the start and end points of the point soldering operation. After the value of the processing flag "flg" is set to "0", a processing loop including steps S210, S220 described with reference to FIG. 4 is executed. When the storage request is output from the operation detector 240 to the position monitoring portion 173, the processing loop including step S210, S220 is ended, and then step S225 is executed.

(Step S225)

The position monitoring portion 173 determines whether or not the value of the processing flag "flg" is "0". If the value of the processing flag "flg" is "0", step S231 is executed. Otherwise, step S232 is executed.

(Step S231)

The position monitoring portion 173 outputs a coordinate value indicating a current position of the iron tip of the soldering iron 115 to the storage 160 as the end point of the point soldering operation. After that, step S235 is executed.

(Step S235)

The position monitoring portion 173 sets the value of the processing flag "flg" to "1". After that, step S232 is executed.

(Step S232)

The position monitoring portion 173 outputs a coordinate value to the storage 160 as the start point of the point soldering operation, the coordinate value indicating a current position of the iron tip of the soldering iron 115. After that, step S245 is executed.

(Step S245)

The position monitoring portion 173 sets the value of the processing flag "flg" to "0". Thereafter, step S250 is executed.

(Step S250)

When the point soldering operation is set for all soldering positions on the electronic board, the operator performs a predetermined operation for completing the teaching operation to the input interface 150. In this case, the output processes of the coordinate values of the position monitoring portion 173 is terminated. Otherwise, step S210 is executed. Thereafter, a processing loop including steps S210 to S250 is executed for other soldering positions, so that the point soldering operation with respect to the other soldering positions is set.

Figure 8:
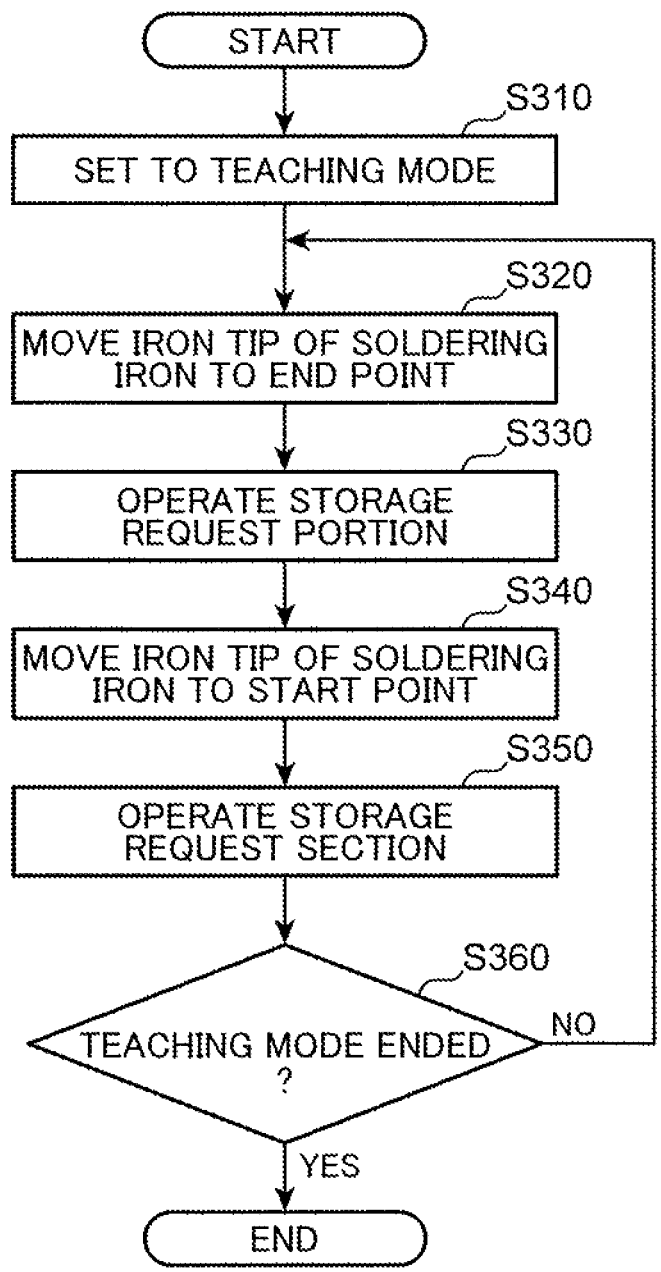
FIG. 8 is a flowchart schematically showing an operator's coordinate input operation for causing the position monitoring portion to execute the output processes shown in FIG. 7.

FIG. 8 is a flowchart schematically showing an operator's coordinate input operation for causing the position monitoring portion 173 to execute the output processes shown in FIG. 7. The coordinate input operation by the operator is described with reference to FIGS. 1, 2, 7 and 8.

(Step S310)

The operator operates the input interface 150 to set an operation mode of the soldering apparatus 100 to a teaching mode. Accordingly, the soldering apparatus 100 accepts input of coordinates in accordance with a subsequent operation on the operation unit 130. When the operation mode of the soldering apparatus 100 is set to the teaching mode step S320 is executed. At this time, step S205 described with reference to FIG. 7 is also executed.

(Step S320)

The operator operates the left and/or right levers 132, 133 to move the iron tip of the soldering iron 115 to a soldering position on the surface of the electronic board (i.e. the end point of the point soldering operation). After that, step S330 is executed.

(Step S330)

The operator operates the storage request portion 134 to store a coordinate value in the soldering apparatus 100, the coordinate value indicating the position of the iron tip set in step S320. In other words, in accordance with the operation on the storage request portion 134, step S231 described with reference to FIG. 7 is executed. When the operator operates the storage request portion 134, the controller 170 and the storage 160 enter a standby state in which the controller 170 waits for input of an end point coordinate, and then step S340 is executed.

(Step S340)

The operator operates the left lever 132 to move up the iron tip of the soldering iron 115 by a predetermined retreat amount. Accordingly, the iron tip of the soldering iron 115 may move upward from the surface of the electronic board by the predetermined retreat amount. Thereafter, step S350 is executed.

(Step S350)

The operator operates the storage request portion 134 to store a coordinate value in the soldering apparatus 100, the coordinate value indicating a position of the iron tip set in step S340 (i.e. a coordinate distance corresponding to the retreat amount). In other words, in accordance with the operation on the storage request portion 134, step S232 described with reference to FIG. 7 is executed. When the operator operates the storage request portion 134, the controller 170 and the storage 160 are in a standby state in which the controller 170 waits for input of a start point coordinate, and then step S360 is executed.

(Step S360)

If the point soldering operation is set for all the soldering positions on the electronic board, the operator operates the input interface 150 to end the teaching mode. In this case, the standby state of the controller 170 and the storage 160 is canceled. Otherwise, step S320 is executed. Accordingly, a processing loop including steps S320 to S360 is repeated until the point soldering operation is set for all the soldering positions on the electronic board. As shown in FIG. 8, the operator may operate the operation unit 130 without operating the input interface 150 and continue to input coordinate values during repetition of the processing loop including steps S320 to S360.

The following table shows a data structure of coordinate values stored in the storage 160.

TABLE 2

|  | Start point (flg = 1) | End point (flg = 0) |
| --- | --- | --- |
| Soldering position 1 | Start point coordinate 1 | End point coordinate 1 |
| Soldering position 2 | Start point coordinate 2 | End point coordinate 2 |
| . | . | . |
| . | . | . |
| . | . | . |
| Soldering position N | Start point coordinate N | End point coordinate N |

"Soldering position 1" in "Table 2" represents a position on the electronic board on which the teaching operation was performed first. "Soldering position 2" in "Table 2" represents a position on the electronic board on which the teaching operation was perforated second. "Soldering position N" in "Table 2" represents a position on the electronic board on which the teaching operation was performed at an Nth position. In correspondence to these soldering positions, the start point coordinates and the end point coordinates are stored in the storage 160 under the processes described with reference to FIGS. 7 and 8.

Figure 9:
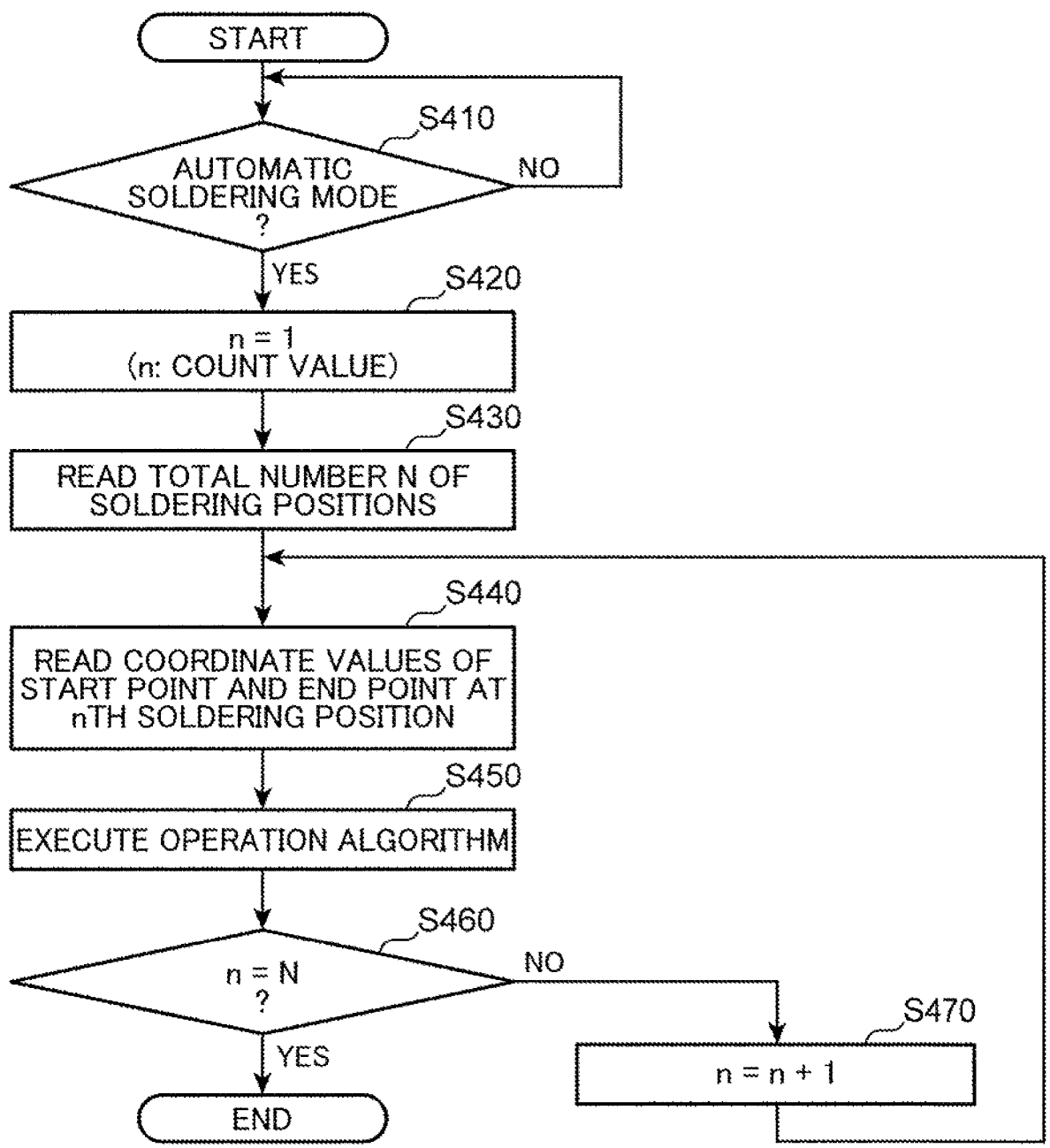
FIG. 9 is a schematic flowchart showing a control operation of a controller in an automatic soldering mode after a teaching operation.

FIG. 9 is a schematic flowchart showing a control operation of the controller 170 in an automatic soldering mode after the teaching operation. With regard to the automatic soldering mode, the soldering apparatus 100 performs the point soldering operation (c.f. FIG. 6) at soldering positions on the electronic board on the basis of the coordinate data (c.f. "Table 2") stored in the storage 160). The control operation of the controller 170 in the automatic soldering mode is described with reference to FIGS. 1, 2, 6 and 9.

(Step S410)

The controller 170 waits for the operator to operate the input interface 150 in order to set the operation mode of the soldering apparatus 100 to the automatic soldering mode. When the operation mode of the soldering apparatus 100 is set to the automatic soldering mode, step S420 is executed.

(Step S420)

The controller 170 sets a value of a count value "n" to "1", the count value "n" being used for processes to determine a soldering position to be processed. After that, step S430 is executed.

(Step S430)

The controller 170 scans the storage 160 to determine a total number "N" of soldering positions to be processed. After that, step S440 is executed.

(Step S440)

The controller 170 reads a start point coordinate and an end point coordinate in correspondence to an nth soldering position. Thereafter, step S450 is executed.

(Step S450)

The controller 170 executes an operation algorithm for executing the point soldering operation described with reference to FIG. 6. Accordingly, the solder feeder 114 and the driving portion 180 operate under the control of the controller 170, so that the point soldering operation described with reference to FIG. 6 is executed. As described with reference to FIG. 6, since the point soldering operation may be set by the start and end points, the controller 170 may use the data read in step S440 to execute the operation algorithm. When "operation 01" to "operation 05" described with reference to FIG. 6 are executed, step S460 is performed.

(Step S460)

The controller 170 checks whether the count value "n" is equal to the total number "N" read in step S430. If the count value "n" is equal to the total number "N", the control operation of the controller 170 under the automatic soldering mode ends. Otherwise, step S470 is executed.

(Step S470).

The controller 170 increments a value of "1" to the count value "n". After that, step S440 is executed. Accordingly, the point soldering operation at a subsequent soldering position is performed.

While a processing loop including steps S440 to S470 is executed, the count value "n" increases by "1". Accordingly, a start point coordinate and an end point coordinate in correspondence to a new soldering position are read in step S440. Under the data structure in "Table 2" and the control operation in FIG. 9, the controller 170 may read the start point coordinates and the end point coordinates of the soldering position in accordance with a teaching order in step S440. Therefore, through the teaching operation described with reference to FIG. 8, the operator may store not only the start and end points of the point soldering operation but also a soldering order in the soldering apparatus 100.

With regard to the aforementioned embodiment, the position monitoring portion 173 may output the positional information to the input interface 150. In this case, the touch panel designed as the input interface 150 may display the coordinate value indicating the current position of the iron tip of the soldering iron 115 represented by the positional information from the position monitoring portion 173. Accordingly, the operator may numerically grasp a current position of the iron tip of the soldering iron 115 by looking at the coordinate value displayed on the touch panel.

With regard to the aforementioned embodiment, the touch panel designed as the input interface 150 may read the coordinate value of the soldering position stored in the storage 160. Accordingly, the operator may numerically grasp the soldering position set by the operation on the operation unit 130.

With regard to the aforementioned embodiment, the installation table 125 moves in the y-axis direction. However, the installation table 125 may move in the x-axis direction and or the z-axis direction or may rotate around the z-axis.

With regard to the aforementioned embodiment, the installation table 125 is movable. However, the installation table to which the electronic board is attached may be of a fixed type. In this case, the soldering apparatus is designed so that the iron tip of the soldering iron 115 may move in the x-axis direction, the y-axis direction and the z-axis direction.

The aforementioned embodiment mainly includes a soldering apparatus having the following configuration and a program for the soldering apparatus.

A soldering apparatus according to one aspect of the aforementioned embodiment includes a soldering iron having an iron tip configured to melt solder; a driving portion configured to move the soldering iron; and an operation portion configured to be displaced for instructing the driving portion of a moving direction of the soldering iron. The driving portion moves the soldering iron in a direction in correspondence to a displacement direction of the operation portion during an operation on the operation portion.

According to the aforementioned configuration, since there is displacement of the operation portion operated for instructing the driving portion of a moving direction of the soldering iron, an operator (a human user) may perceive the operation of the operation portion without looking at the operation portion. Therefore, the operator does not have to look at the operation portion, so that the operator may keep watching the iron tip during the operation on the operation portion. Since the operator may simultaneously instruct the moving direction of the soldering iron and confirm a position of the iron tip of the soldering iron moving in the moving direction on the basis of the operation direction of the operation portion, the operator may efficiently confirm the operation of the soldering apparatus.

With regard to a conventional operation using a personal computer, an operator has to understand a complicated operation method of an application for inputting a coordinate value of a soldering position. This results in a heavy load to the operator. According to the aforementioned configuration, the driving portion moves the soldering iron in the moving direction associated with the displacement direction of the operation portion during the operation on the operation portion. Accordingly, the operator may operate the operation portion on the basis of feeling of the operator himself/herself to move the soldering iron more intuitively than with the conventional operation. Therefore, the aforementioned soldering apparatus may move the soldering iron under a more user-friendly operation as compared to the conventional operation.

A soldering apparatus according to another aspect of the aforementioned embodiment includes a soldering iron having an iron tip configured to melt solder, a driving portion configured to move the soldering iron, and an operation portion to be operated for instructing the driving portion of a moving direction of the soldering iron. The operation portion allows an operator operating the operation portion to perceive an operation direction of the operation portion through a tactile sense of the operator. The driving portion moves the soldering iron in a direction in correspondence to the operation direction of the operation portion during the operation on the operation portion.

According to the aforementioned configuration, the operation portion allows the operator operating the operation portion to perceive an operation direction of the operation portion through the tactile sense of the operator, so that the operator may grasp how the operation portion is operated on the basis of the operator's own tactile sense. Since the operator does not have to look at the operation portion, the operator may keep watching the iron tip during the operation on the operation portion. Since the operator may simultaneously instruct the moving direction of the soldering iron and confirm a position of the iron tip of the soldering iron moving in the moving direction in accordance with the operation direction of the operation portion, the operator may efficiently confirm the operation of the soldering apparatus.

With regard to a conventional operation using a personal computer, the operator has to understand the complicated operation method of an application for inputting a coordinate value of the soldering position. This results in a heavy load to the operator. According to the aforementioned configuration, the driving portion moves the soldering iron in the moving direction in accordance with the operation direction of the operation portion during the operation on the operation portion, so that the operator may operate the operation portion on the basis of the tactile sense of the operator himself/herself to move the soldering iron more intuitively than with the conventional operation. Therefore, the aforementioned soldering apparatus may move the soldering iron under a more user-friendly operation as compared to the conventional operation.

With regard to the aforementioned configuration, the soldering apparatus may further include a controller configured to control the driving portion; and a detector configured to detect an operation on the operation portion. The operation portion may include a lever portion to be tilted for instructing the driving portion of the moving direction of the soldering iron. The detector may include a tilt detector configured to detect a tilt of the lever portion. The controller may determine the moving direction of the soldering iron on the basis of a tilt direction of the lever portion detected by the tilt detector. The driving portion may move the soldering iron in the moving direction determined by the controller.

According to the aforementioned configuration, since a direction of a reaction force received by an operator's fingertip from the lever portion and a direction of a frictional force generated between the fingertip and the lever portion change in accordance with the tilt of the lever portion, the operator may grasp the tilt direction of the lever portion on the basis of a tactile sense given to the operator by the lever portion. In other words, the operator may determine what kind of operation the operator intends to make on the soldering apparatus on the basis of the tactile sense of the operator himself/herself.

The controller determines a moving direction of the soldering iron in accordance with the tilt direction of the lever portion detected by the tilt detector, so that the operator may intuitively associate a moving direction of his/her finger which has touched the lever portion with the moving direction of the soldering iron. Therefore, the operator may tilt the lever portion to intuitively move the soldering iron.

With regard to the aforementioned configuration, the controller may set a moving speed of the soldering iron to a first speed when a tilt amount of the lever portion detected by the tilt detector is a first value. The controller may set the moving speed of the soldering iron to a second speed which is higher than the first speed when the tilt amount of the lever portion detected by the tilt detector is a second value which is larger than the first value. The driving portion may move the soldering iron at the moving speed determined by the controller.

According to the aforementioned configuration, the operator may judge a tilt amount of the lever portion on the basis of a moving amount of the finger which has touched the lever portion. Since the controller determines a moving speed of the soldering iron in accordance with the tilt amount of the lever portion detected by the tilt detector, the operator may intuitively associate the moving amount of his/her finger which has touched the lever portion with the moving speed of the soldering iron. The operator who desires to move the soldering iron quickly may move the finger which has touched the lever portion largely. The operator who desires to move the soldering iron slowly may move the finger which has touched the lever portion small. Therefore, the operator may intuitively adjust the moving speed of the soldering nun by operating the lever portion.

With regard to the aforementioned configuration, the lever portion may include a first lever configured to be operated for moving the iron tip along a predetermined x-axis. The driving portion may move the iron tip relative to a surface of an electronic board to be soldered by the soldering iron in an extending direction of the x-axis when the first lever is tilted in the extending direction of the x-axis.

According to the aforementioned configuration, since the tilt direction of the first lever and the moving direction of the iron tip of the soldering iron coincide with each other in the extending direction of the x-axis, the operator may operate the first lever to intuitively move the iron tip relatively.

With regard to the aforementioned configuration, the driving portion may move the iron tip relative to the surface of the electronic board in an extending direction of a y-axis orthogonal to the x-axis when the first lever is tilted in the extending direction of the y-axis.

According to the aforementioned configuration, since the tilt direction of the first lever and the moving direction of the iron tip of the soldering iron coincide with each other in the extending direction of the y-axis, the operator may operate the first lever to intuitively move the iron tip relatively.

With regard to the aforementioned configuration, the lever portion may include a second lever to be operated for adjusting a positional relationship between the surface of the electronic board and the iron tip along a z-axis orthogonal to the x-axis and the y-axis and to make the iron tip go around the z-axis above the surface of the electronic board.

According to the aforementioned configuration, the operator may understand the second lever as a portion exclusively responsible for moving the iron tip related to the z-axis orthogonal to the x-axis and the y-axis. Therefore, the operator may easily understand a function of the second lever without being confused with a function carried by the first lever.

With regard to the aforementioned configuration, the soldering apparatus may further include storage configured to store a coordinate value of a soldering position at which soldering is performed. The operation portion may include a storage request portion configured to be operated for requesting storage of the coordinate value. The detector may include an operation detector configured to detect an operation on the storage request portion. The controller may monitor a current position of the soldering iron, and cause the storage to store a coordinate value indicating the current position as the coordinate value of the soldering position when the operation detector detects the operation on the storage request portion.

According to the aforementioned configuration, the operator may operate the lever portion to move the iron tip to a desired position. When the iron tip reaches the desired position, the operator may operate the storage request portion to request storage of the coordinate value of the soldering position. Since the operator may judge whether or not the storage request portion is operated on the basis of a tactile sense of the operator himself/herself, the operator may continue to visually confirm a position of the iron tip during the operation on the storage request portion. In other words, the operator may operate the storage request portion simultaneously with the positional confirmation of the iron tip.

While the soldering iron moves under the operation of the operation portion, the controller monitors a current position of the soldering iron. In accordance with the storage request, the controller causes the storage to store the coordinate value of the current position represented by the positional information as the coordinate value of the soldering position. Therefore, the position of the iron tip confirmed by the operator is stored in the storage as the coordinate value of the soldering position.

With regard to the aforementioned configuration, the soldering apparatus may further include storage configured to store a coordinate value of a soldering position at which soldering is performed; and a housing in which the detector is stored. The operation portion may include a storage request portion configured to be operated for requesting storage of the coordinate value. The detector may include an operation detector configured to detect an operation on the storage request portion. The controller may monitor a current position of the soldering iron, and cause the storage to store a coordinate value indicating the current position as the coordinate value of the soldering position when the operation detector detects the operation on the storage request portion. The lever portion may include a first lever configured to be operated for moving the iron tip relative to a surface of an electronic board to be soldered by the soldering iron along a predetermined x-axis and a y-axis orthogonal to the x-axis, and a second lever configured to be operated for adjusting a positional relationship between the surface of the electronic board and the iron tip along a z-axis orthogonal to the x-axis and the y-axis and to make the iron tip go around the z-axis above the surface of the electronic board. The housing may include a surface from which the first and second levers protrude. The storage request portion may be a pressing button appearing between the first and second levers on the surface of the housing. The pressing button may be different in surface profile from the housing, or less protrusive from the surface of the housing than the first and second levers.

According to the aforementioned configuration, since the detector is stored in the housing, the operator does not touch the detector during operation on the operation portion. Therefore, there is a low risk of malfunction of the detector due to contact of the operator.

Since the pressing button used as the storage request portion appears on the surface of the housing between the first and second levers, the first lever is distant from the second lever by an area required for arranging the pressing button. Therefore, there is a low risk of the operator confusing the first lever with the second lever during the operation.

Since the pressing button is different in surface profile from the housing or less protrusive from the surface of the housing than the first and second levers, the operator may easily judge whether or not the operator touches the pressing button with his/her fingertip.

The operator may operate the lever portion to move the iron tip to a desired position. When the iron tip reaches the desired position, the operator may request storage of a coordinate value of the soldering position by operating the pressing button. Since the operator may judge whether or not the pressing button is operated on the basis of a tactile sense of the operator himself/herself, the operator may continue to visually confirm a position of the iron tip during operation on the pressing button. In other words, the operator may operate the pressing button at the same time as confirming a position of the iron tip.

While the soldering iron moves under the operation of the operation portion, the controller monitors a current position of the soldering iron. In accordance with the storage request, the controller causes the storage to store the coordinate value of the current position represented by the positional information as a coordinate value of the soldering position. Therefore, the position of the iron tip confirmed by the operator is stored in the storage as the coordinate value of the soldering position.

With regard to the aforementioned configuration, under control of the controller, the storage may store the coordinate value of the soldering position as an end point of a point soldering operation for adhering dot-shaped solder to an electronic board and another coordinate value stored immediately before or after the coordinate value of the soldering position as a start point of the point soldering operation. After the coordinate values of the start and end points are stored in the storage, the controller may read the coordinate values stored as the start and end points in the storage and control the driving portion so that the iron tip of the soldering iron moves from the start point to the end point.

According to the aforementioned configuration, under the control of the controller, the storage stores the coordinate value of the soldering position as the end point of the point soldering operation for adhering dot-shaped solder to the electronic board as the soldering operation, and the other coordinate value stored immediately before or after the coordinate value of the soldering position as the start point of the point soldering operation. Accordingly, the operator may set the point soldering operation only by tilting the lever portion and operating the storage request portion.

In other words, unlike the background art, after the operator operates the pressing button to request storage of the coordinate value of the soldering position, the controller automatically becomes a state in which the controller waits for the storage request to a subsequent point. Accordingly, the operator may tilt the operating lever to find a subsequent desired position. For example, since an input standby state is automatically switched in the order of an end point coordinate, a start point coordinate, an end point coordinate and a start point coordinate, the operator may set the point soldering operation without moving a line of sight to a personal computer to operate the personal computer. Since the controller reads positional data stored as the start and end points in the storage to control the driving portion so that the iron tip of the soldering iron moves from the start point to the end point, the dot-shaped solder may be adhered to a desired position on the electronic board.

With regard to the aforementioned configuration, under the control of the controller, the storage may store the coordinate value of the soldering position as an end point of a point soldering operation for adhering dot-shaped solder to an electronic board and another coordinate value stored immediately before or after the coordinate value of the soldering position as a start point of the point soldering operation. After the coordinate values of the start and end points are stored in the storage, the controller automatically becomes a state in which the controller waits for a storage request of a subsequent coordinate position.

According to the aforementioned configuration, since an input standby state is automatically switched in the order of an end point coordinate, a start point coordinate, an end point coordinate and a start point coordinate, the operator may set the point soldering operation without moving a line of sight to a personal computer to operate the personal computer. Since the controller reads positional data stored as the start and end points in the storage to control the driving portion so that the iron tip of the soldering iron moves from the start point to the end point, the dot-shaped solder may be adhered to a desired position on the electronic board.

With regard to the aforementioned configuration, the coordinate value of the soldering position, which defines the start and end points, is referred to the positional data of the soldering position. After the positional data of the soldering position is stored in the storage, and when an operation oldie storage request is detected by the operation detector, the controller may cause the storage to store a coordinate distance of a current position of the soldering iron situated for a subsequent soldering position, at which soldering is to be performed. The coordinate distance is stored as positional data of the subsequent soldering position. After the positional data of the soldering position and the positional data of the subsequent soldering position are stored in the storage, the controller may read the positional data of the soldering position and the positional data of the subsequent soldering position to control the driving portion so that the iron tip of the soldering iron moves from the start point of the soldering position to the end point of the soldering position and returns to the start point, and then controls the driving portion so that the iron tip of the soldering iron moves to a position specified by the positional data of the subsequent soldering position.

According to the aforementioned configuration, after the positional data of the soldering position is stored in the storage, and when an operation of the storage request is detected by the operation detector, the controller causes the storage to store a coordinate distance of a current position of the soldering iron situated for a subsequent soldering position. Accordingly, the operator ma set a point soldering operation for soldering positions without operating the personal computer. After the positional data for the soldering position and the positional data for the subsequent soldering position are stored in the storage, the controller reads the positional data for the two soldering positions so that the iron tip moves from the start point to the end point of the soldering position and returns to the start point, and then controls the driving portion so that the iron tip moves to the subsequent soldering position. Accordingly, the soldering iron may move on the electronic board in accordance with an order in which the operator has stored the coordinate values in the storage.

With regard to the aforementioned configuration, the soldering apparatus may further include a base configured to support the soldering iron; and an installation table on which an electronic board is installed to be soldered by the soldering iron. The installation table and the operation portion may be attached to the base.

According to the aforementioned configuration, since the installation table on which the electronic board is installed to be soldered is attached to the base supporting the soldering iron, the operator may confirm a soldering position on the electronic board near the base. Since the operation portion is also attached to the base, the operator near the base may easily access the operation portion.

With regard to the aforementioned configuration, the soldering apparatus may further include a base configured to support the soldering iron; and an installation table on which an electronic board is installed to be soldered by the soldering iron. The installation table and the operation portion may be attached to the base. The lever portion may protrude in a recessed region which is recessed on a peripheral surface of the base.

According to the aforementioned configuration, since the installation table on which the electronic board is installed to be soldered is attached to the base supporting the soldering iron, the operator confirms a soldering position on the electronic board near the base. Since the operation portion is also attached to the base, the operator near the base may easily access the operation portion.

Since the lever portion protrudes in the recessed region which is recessed on the peripheral surface of the base, the lever portion is less likely to protrude from the surface of the base. Therefore, there is a low risk of the operator unintentionally touching the lever portion.

A method for creating a program of a soldering operation according to another aspect of the aforementioned embodiment includes repeating an input operation for determining the point soldering operation until the point soldering operation is set for all of soldering positions on the electronic board. The input operation includes (i) operating the lever portion to move the iron tip to a position in correspondence to one of the start and end points of one of the soldering positions, (ii) operating the storage request portion to store a coordinate value of the position in correspondence to the one of the start and end points in the storage, (iii) operating the lever portion to move the iron tip to a position in correspondence to another of the start and end points, and (iv) operating the storage request portion to store a coordinate value of the position in correspondence to the other of the start and end points in the storage.

According to the aforementioned configuration, the operator may operate the lever portion to move the iron tip to a position in correspondence to one of the start and end points of one of the soldering positions. The operator may then operate the storage request portion to store the coordinate value of the position in correspondence to the one of the start and end points in the storage. The operator may operate the lever portion to further move the iron tip to the position in correspondence to the other of the start and end points. Thereafter, the operator may operate the storage request portion to store the coordinate value of the position in correspondence to the other of the start and end points in the storage. As a result of these input operations, the coordinate values of the start and end points in correspondence to the one of the soldering positions are stored in the storage. Meanwhile, the operator does not have to operate a personal computer. Since these input operations are repeated until the point soldering operation is set for all of the soldering positions on the electronic board, the operator does not have to operate the personal computer during the setting of the point soldering operation at the soldering positions on the electronic board. Therefore, the operator may concentrate on the movement of the iron tip of the soldering iron without being distracted by the operation of the personal computer.

The principle of the aforementioned embodiment is suitably used for various work sites where soldering work is performed.

The invention claimed is:

1. A soldering apparatus comprising:
a soldering iron having an iron tip configured to melt solder;
a driving portion configured to move the soldering iron;
an operation portion configured to be displaced for instructing the driving portion of a moving direction of the soldering iron;
a controller configured to control the driving portion; and
a detector configured to detect the operation on the operation portion,
wherein the driving portion moves the soldering iron in a direction in correspondence to a displacement direction instructed by the operation portion during an operation on the operation portion,
wherein the operation portion includes a lever portion to be tilted for instructing the driving portion of the moving direction of the soldering iron,
wherein the detector includes a tilt detector configured to detect a tilt direction of the lever portion,
wherein the controller determines the moving direction of the soldering iron based on the tilt direction of the lever portion detected by the tilt detector, and
wherein the driving portion moves the soldering iron in the moving direction determined by the controller.

2. The soldering apparatus according to claim 1,
wherein the controller sets a moving speed of the soldering iron to a first speed when a tilt amount of the lever portion detected by the tilt detector is a first value,
wherein the controller sets the moving speed of the soldering iron to a second speed which is higher than the first speed when the tilt amount of the lever portion detected by the tilt detector is a second value which is larger than the first value, and
wherein the driving portion moves the soldering iron at the moving speed set by the controller.

3. The soldering apparatus according to claim 1,
wherein the lever portion includes a first lever configured to be operated for moving the iron tip along a predetermined x-axis, and
wherein the driving portion moves the iron tip relative to a surface of an electronic board to be soldered by the soldering iron in an extending direction along the x-axis when the first lever is tilted in the extending direction along the x-axis.

4. The soldering apparatus according to claim 3,
wherein the driving portion moves the iron tip relative to a surface of the electronic board in an extending direction along a y-axis orthogonal to the x-axis when the first lever is tilted in the extending direction along the y-axis.

5. The soldering apparatus according to claim 4,
wherein the lever portion includes a second lever configured to be operated for adjusting a positional relationship between the surface of the electronic board and the iron tip along a z-axis orthogonal to the x-axis and the y-axis and for rotating the iron tip around the z-axis above the surface of the electronic board.

6. The soldering apparatus according to claim 1, further comprising:
storage configured to store a coordinate value of a soldering position at which soldering is to be performed,
wherein the operation portion includes a storage request portion configured to be operated for requesting storage of the coordinate value,
wherein the detector includes an operation detector configured to detect an operation on the storage request portion, and
wherein the controller monitors a current position of the soldering iron, and causes the storage to store a coordinate value indicating the current position as the coordinate value of the soldering position when the operation detector detects the operation on the storage request portion.

7. The soldering apparatus according to claim 1, further comprising:
storage configured to store a coordinate value of a soldering position at which soldering is to be performed; and
a housing in which the detector is stored,
wherein the operation portion includes a storage request portion configured to be operated for requesting storage of the coordinate value,
wherein the detector includes an operation detector configured to detect an operation on the storage request portion,
wherein the controller monitors a current position of the soldering iron, and causes the storage to store a coordinate value indicating the current position as the coordinate value of the soldering position when the operation detector detects the operation on the storage request portion,
wherein the lever portion includes a first lever configured to be operated for moving the iron tip relative to a surface of an electronic board to be soldered by the soldering iron along a predetermined x-axis and a y-axis orthogonal to the x-axis, and a second lever configured to be operated for adjusting a positional relationship between a surface of the electronic board and the iron tip along a z-axis orthogonal to the x-axis and the y-axis and for rotating the iron tip around the z-axis above the surface of the electronic board,
wherein the housing includes a surface from which the first and second levers protrude,
wherein the storage request portion is a pressing button disposed between the first and second levers on a surface of the housing, and
wherein the pressing button is different in surface profile from the housing, or less protrusive from the surface of the housing than the first and second levers.

8. The soldering apparatus according to claim 6,
wherein under the control of the controller, the storage stores the coordinate value of the soldering position as an end point of a point soldering operation for adhering dot-shaped solder to an electronic board and stores another coordinate value immediately before or after the coordinate value of the soldering position as a start point of the point soldering operation, and wherein after the coordinate values of the start and end points are stored in the storage, the controller automatically goes to a state in which the controller waits for a storage request of a subsequent coordinate position, the storage request corresponding to the operation detector detecting a subsequent operation on the operation portion.

9. The soldering apparatus according to claim 6,
wherein the coordinate value of the soldering position, which defines start and end points of a soldering operation, is referred to as positional data,
wherein after the positional data of the soldering position is stored in the storage, and when an operation on the storage request portion is detected by the operation detector, the controller causes the storage to store a coordinate distance of a current position of the soldering iron situated for a subsequent soldering position at which soldering is to be performed, the coordinate distance being stored as positional data of the subsequent soldering position, and
wherein after the positional data of the soldering position and the positional data of the subsequent soldering position are stored in the storage, the controller reads the positional data of the soldering position and the positional data of the subsequent soldering position to control the driving portion so that the iron tip of the soldering iron moves from the start point of the soldering position to the end point of the soldering position and returns to the start point, and then controls the driving portion so that the iron tip of the soldering iron moves to a position specified by the positional data of the subsequent soldering position.

10. The soldering apparatus according to claim 1, further comprising:
a base configured to support the soldering iron; and
an installation table on which an electronic board is installed to be soldered by the soldering iron,
wherein the installation table and the operation portion are attached to the base, and
wherein the lever portion protrudes from a recessed region which is recessed on a peripheral surface of the base.

11. A soldering apparatus comprising:
a soldering iron having an iron tip configured to melt solder;
a driving portion configured to move the soldering iron;
an operation portion configured to be displaced for instructing the driving portion of a moving direction of the soldering iron;
a base configured to support the soldering iron; and
an installation table on which an electronic board is installed to be soldered by the soldering iron,
wherein the driving portion moves the soldering iron in a direction in correspondence to a displacement direction instructed by the operation portion during an operation on the operation portion,
wherein the installation table and the operation portion are attached to the base.

* * * * *